(12) United States Patent
Urella

(10) Patent No.: US 12,073,512 B2
(45) Date of Patent: Aug. 27, 2024

(54) KEY FRAME SELECTION USING A VOXEL GRID

(71) Applicant: STREEM, LLC, Portland, OR (US)

(72) Inventor: Nikilesh Urella, Portland, OR (US)

(73) Assignee: STREEM, LLC, Portland, OR (US)

( * ) Notice: Subject to any disclaimer, the term of this patent is extended or adjusted under 35 U.S.C. 154(b) by 148 days.

(21) Appl. No.: 17/949,923

(22) Filed: Sep. 21, 2022

(65) Prior Publication Data

US 2024/0096019 A1    Mar. 21, 2024

(51) Int. Cl.
*G06T 17/20* (2006.01)
*G06T 7/50* (2017.01)

(52) U.S. Cl.
CPC ............... *G06T 17/20* (2013.01); *G06T 7/50* (2017.01); *G06T 2207/10028* (2013.01)

(58) Field of Classification Search
CPC .................................. G06T 17/20; G06T 7/50
See application file for complete search history.

(56) References Cited

U.S. PATENT DOCUMENTS

| | | | | |
|---|---|---|---|---|
| 2020/0043189 | A1* | 2/2020 | Bao | G06T 7/75 |
| 2021/0110599 | A1* | 4/2021 | Fang | G06T 7/55 |
| 2023/0293271 | A1* | 9/2023 | Knudby | A61C 9/0053 |
| | | | | 382/154 |

FOREIGN PATENT DOCUMENTS

CN    113516750 A   * 10/2021

OTHER PUBLICATIONS

Machine translation of CN 113516750 A (Year: 2021).*

* cited by examiner

*Primary Examiner* — Ryan McCulley
(74) *Attorney, Agent, or Firm* — Schwabe Williamson & Wyatt

(57) ABSTRACT

A sequence of frames including color and depth data is processed to identify key frames while minimizing redundancy. A sparse 3D point cloud is obtained for each frame and represented by a set of voxels. Each voxel has associated data indicating, e.g., a depth and a camera viewing angle. When a new frame is processed, a new sparse 3D point cloud is obtained. For points which are not encompassed by the existing voxels, new voxels are created. For points which are encompassed by the existing voxels, a comparison determines whether the depth data of the new frame is more accurate than the existing depth data. A frame is selected as a key frame based on factors such as a number of new voxels which are created, a number of existing voxels for which the depth data is updated, and accuracy scores.

19 Claims, 17 Drawing Sheets

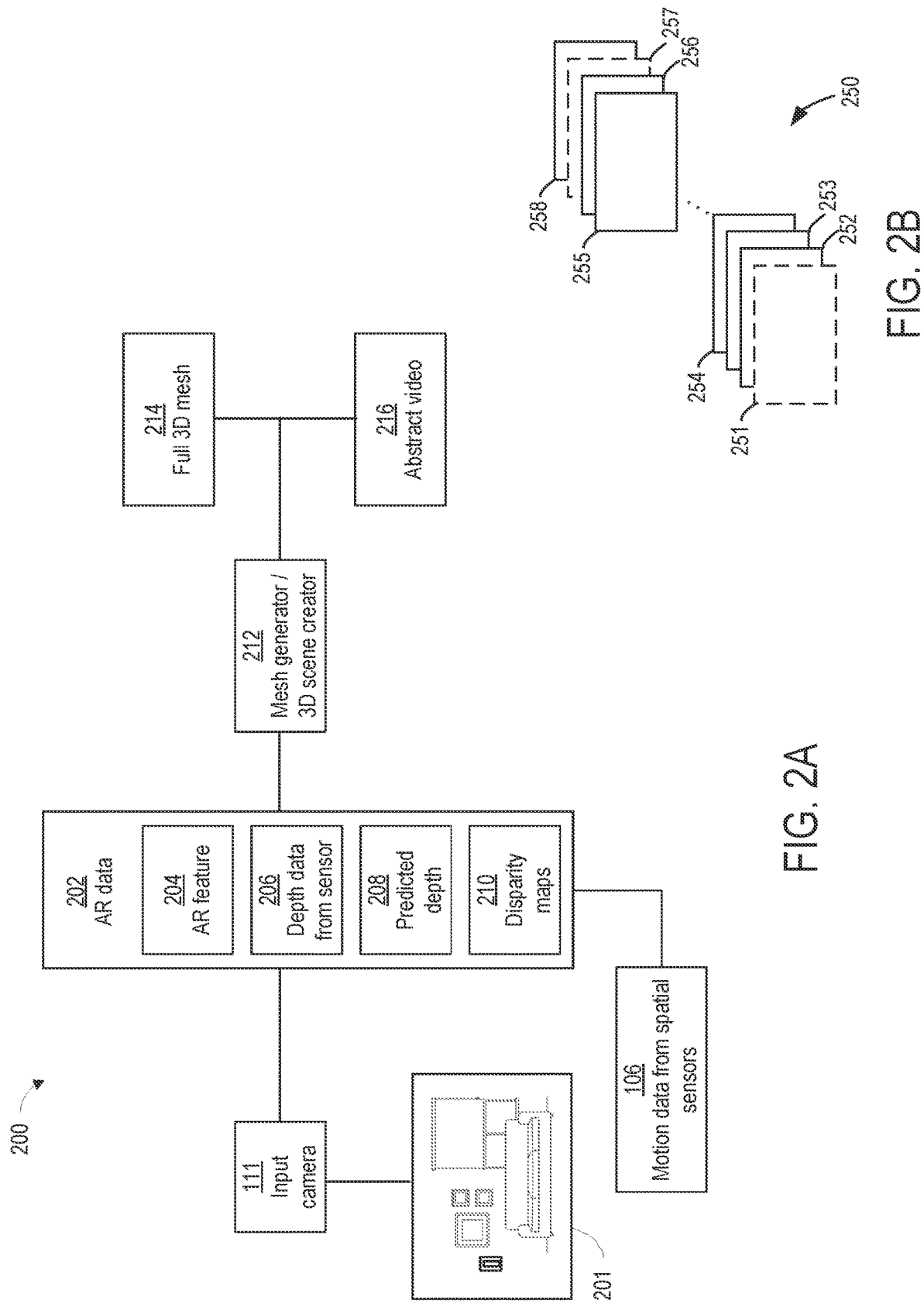

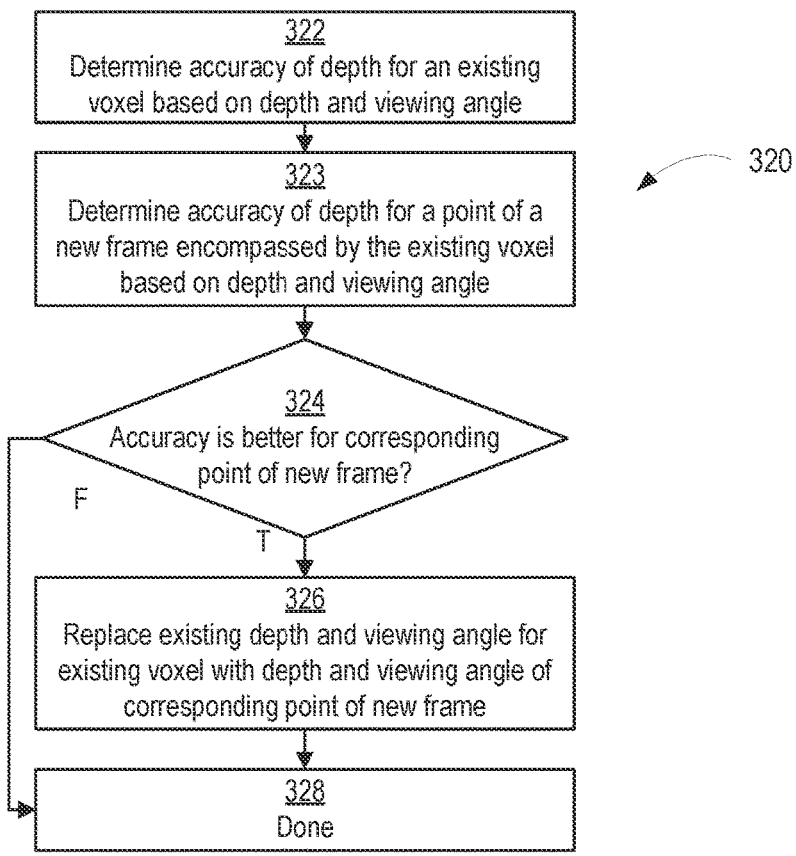
FIG. 3B
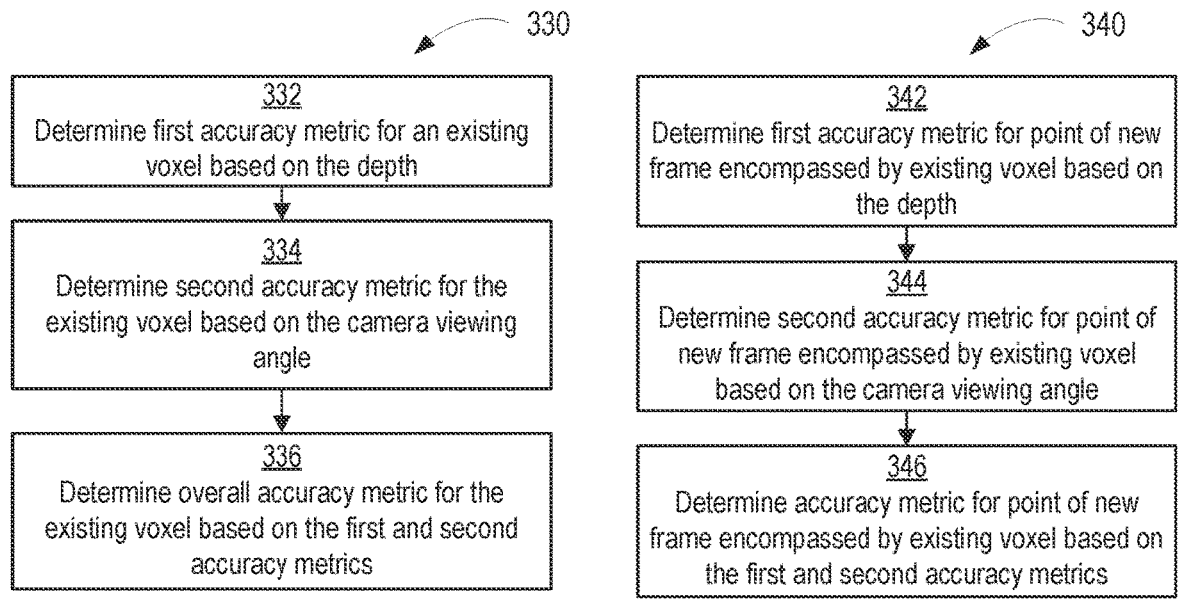
FIG. 3C1  FIG. 3C2

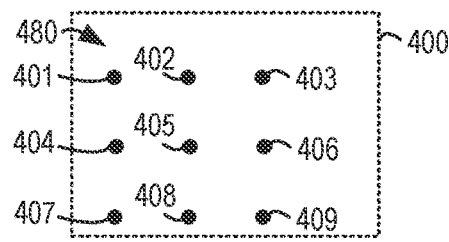
FIG. 4A
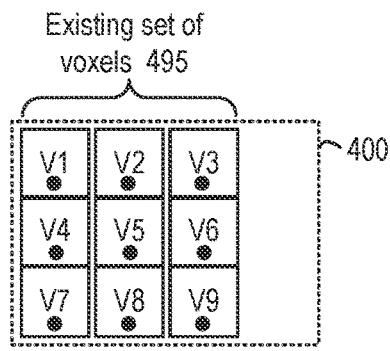
FIG. 4B
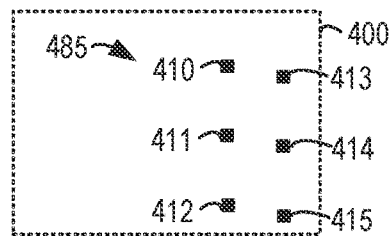
FIG. 4C
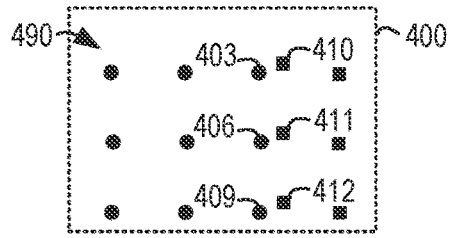
FIG. 4D
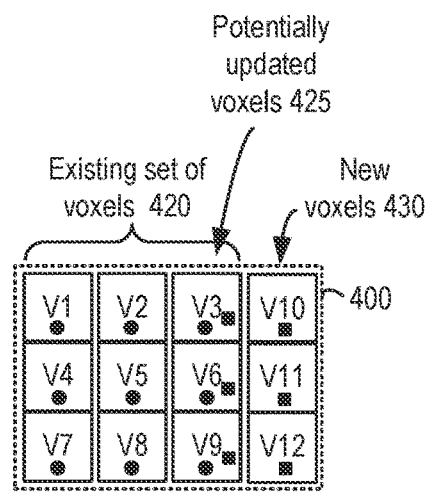
FIG. 4E
| Voxel (point) | Depth | VA | M | EP | Depth | VA | M |
|---|---|---|---|---|---|---|---|
| V1(401) | D1 | VA1 | | | | | |
| V2(402) | D2 | VA2 | | | | | |
| V3(403) | D3 | VA3 | M3 | 410 | D3A | VA3A | M3A |
| V4(404) | D4 | VA4 | ←—————Compare————→ | | | | |
| V5(405) | D5 | VA5 | | | | | |
| V6(406) | D6 | VA6 | M6 | 411 | D6A | VA6A | M6A |
| V7(407) | D7 | VA7 | ←—————Compare————→ | | | | |
| V8(408) | D8 | VA8 | | | | | |
| V9(409) | D9 | VA9 | M9 | 412 | D9A | VA9A | M9A |
| V10(413) | D10 | VA10 | ←—————Compare————→ | | | | |
| V11(414) | D11 | VA11 | | | | | |
| V12(415) | D12 | VA12 | | | | | |
FIG. 4F

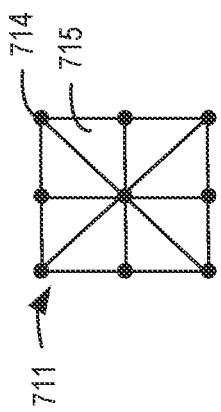
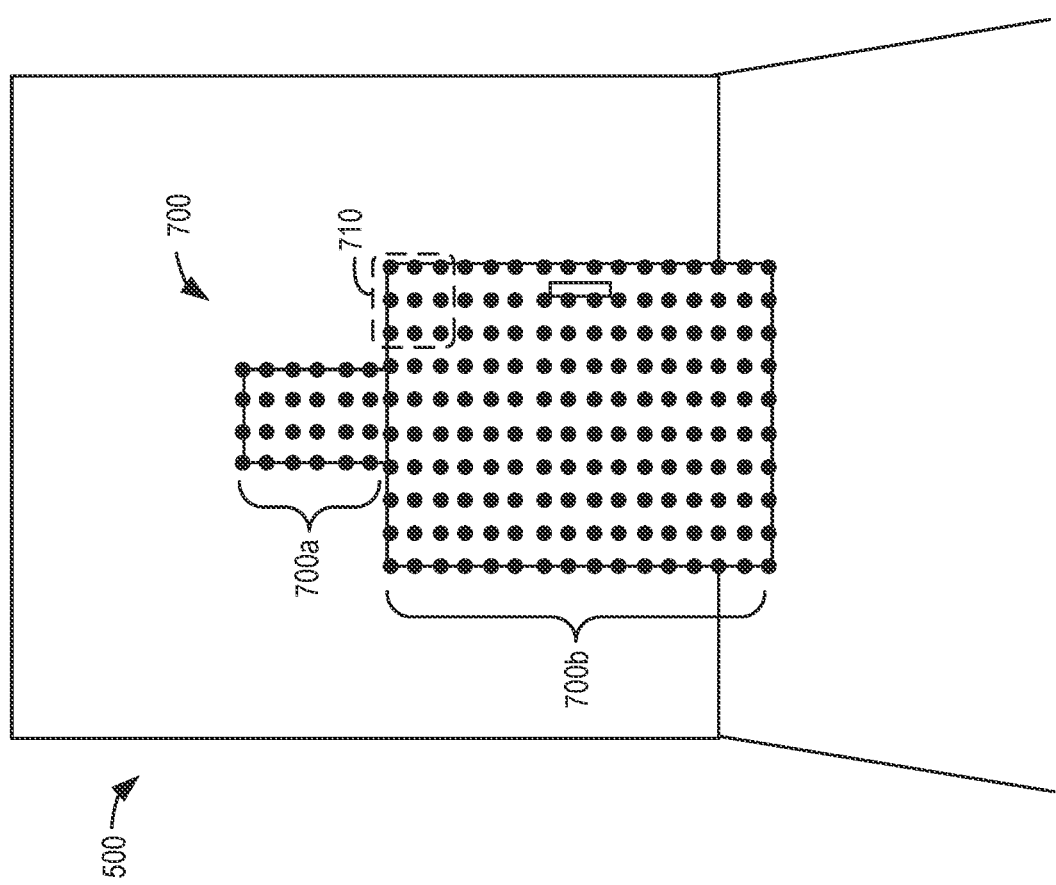
FIG. 7B
FIG. 7A

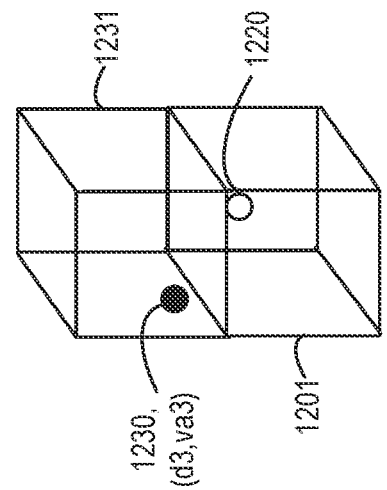
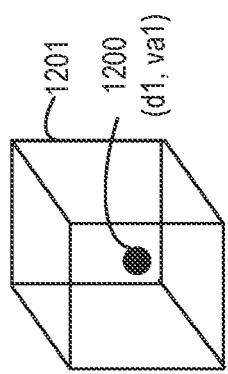
FIG. 12C
FIG. 12A
FIG. 12B

KEY FRAME SELECTION USING A VOXEL GRID

TECHNICAL FIELD

The present disclosure relates to the field of photogrammetry, and specifically to the identification of key frames.

BACKGROUND

Devices such as smartphones and tablets are increasingly capable of measuring and/or computing depth data of images or videos they capture, which in turn are useful for supporting augmented reality (AR) and/or other applications involving 3D spaces. These captured images or video and derived or captured depth data may be processed using various algorithms to detect features in the video, such as planes, surfaces, faces, and other recognizable shapes. These detected features, combined in some implementations with data from depth sensors and/or motion information captured from motion sensors such as a Micro-Electro-Mechanical System (MEMS) gyroscope and accelerometers, can be used by software in creating a point cloud in a 3D space. A 3D mesh representation of the point cloud can in turn be obtained to represent the 3D space more efficiently. The 3D mesh include vertices which represents boundaries of real objects in the 3D space. The point cloud or 3D mesh enables operations such as measurements of physical dimensions of the real objects.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 2A depicts an example high-level process flow for generating a 3D mesh and virtual reconstruction from a captured video and associated AR data, according to various embodiments.

FIG. 2B depicts an example set of video frames 250 in which selected frames 251 and 257 are key frames, according to various embodiments.

FIG. 3B is a flowchart of the operations of an example method 320 for comparing and updating existing voxels in operation 310 of FIG. 3A, according to various embodiments.

FIG. 3C1 is a flowchart of an example method 330 for determining an accuracy metric for an existing voxel, consistent with operation 322 FIG. 3B, according to various embodiments.

FIG. 3C2 is a flowchart of an example method 340 for determining an accuracy metric for a point of a new frame which is encompassed by an existing voxel, consistent with operation 323 of FIG. 3B, according to various embodiments.

FIG. 4A depicts an example of an existing sparse 3D point cloud 480, consistent with operation 302 of FIG. 3A, according to various embodiments.

FIG. 4B depicts an example of a set of voxels 495 which encompass the points of the point cloud of FIG. 4A, according to various embodiments.

FIG. 4C depicts an example of a new sparse 3D point cloud 485, consistent with operation 306 of FIG. 3A, according to various embodiments.

FIG. 4D depicts an example of the point clouds of FIGS. 4A and 4C combined, according to various embodiments.

FIG. 4E depicts an example of new voxels V10-V12 which encompass new points which are not within the existing voxels of FIG. 4B, consistent with operation 308 of FIG. 3A, and other new points which are within existing voxels V3, V6 and V9, according to various embodiments.

FIG. 4F depicts a table of data including voxel id and associated depth, viewing angle (VA) and accuracy metric (M), in addition to encompassed points (EPs) and associated depth, viewing angle and accuracy metric, consistent with FIG. 4A to 4E, and according to various embodiments.

FIG. 7A depicts an example sparse 3D point cloud 700 consistent with the view of FIG. 6 and the method of FIG. 3A, operation 302, according to various embodiments.

FIG. 7B depicts an example mesh model 711 corresponding to a portion 710 of the sparse 3D point cloud 700 of FIG. 7A, according to various embodiments.

FIG. 12A depicts an example point 1200 with a depth d1 in an initial voxel 1201, consistent with operation 304 of FIG. 3A, according to various embodiments.

FIG. 12B depicts an additional point 1210 with a depth d2 which is within the voxel 1201 of FIG. 12A, and a point 1220 which represents an average between the two points, consistent with operation 304 of FIG. 3A, according to various embodiments.

FIG. 12C depicts an additional point 1230 with a depth d3 in a new voxel 1231, consistent with operation 308 of FIG. 3A, according to various embodiments.

DETAILED DESCRIPTION OF DISCLOSED EMBODIMENTS

Figure 1:
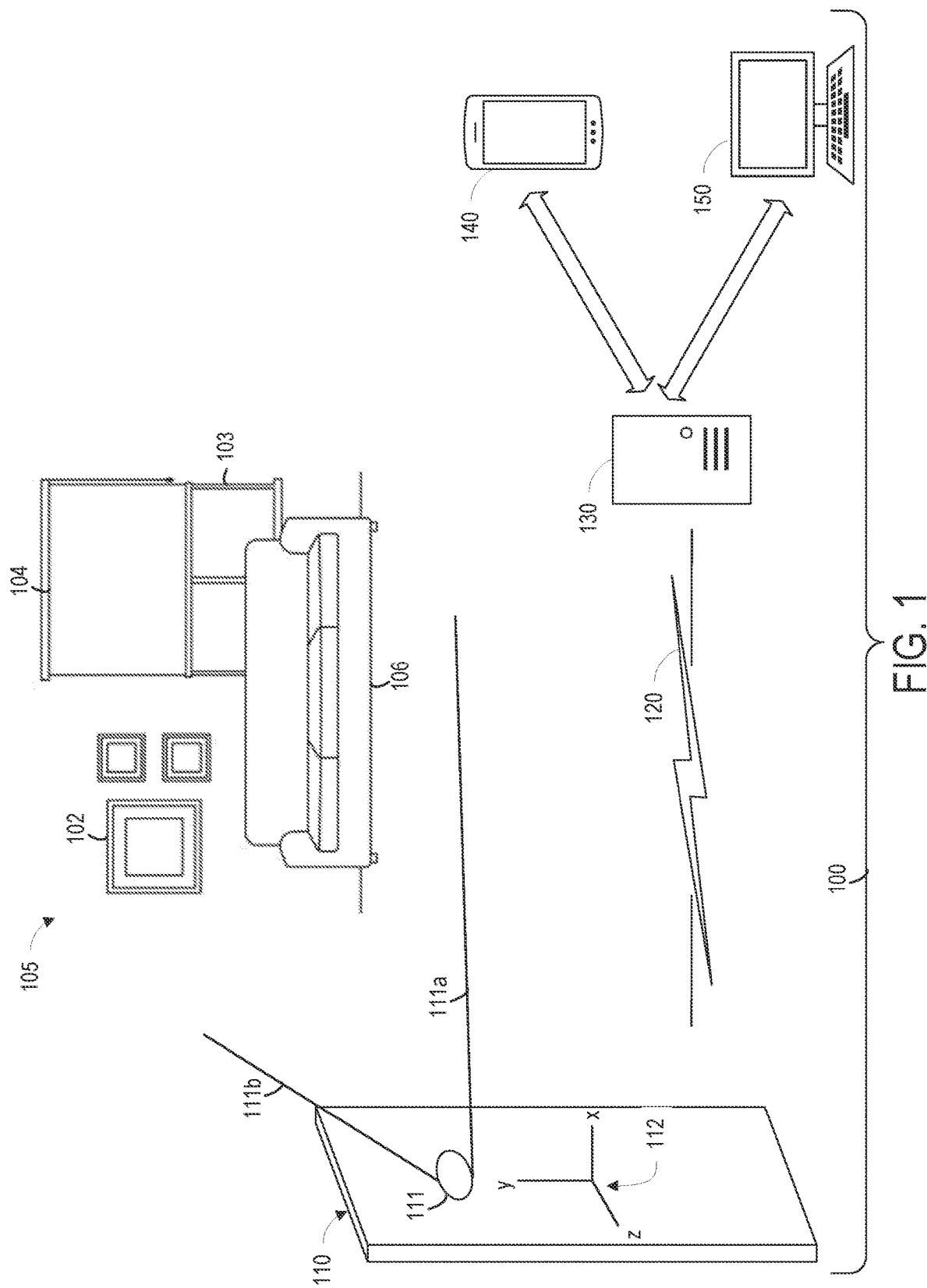
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

People increasingly rely upon remote communications technology to interact with each other. Modern smartphones, as well as camera-equipped laptops and desktop computers, can support the exchange of video data, to allow video chat as well as remote collaboration tools. For example, video conferencing can be blended with screen sharing and collaborative editing tools to allow a group of people who are remote from each other to collectively work on a document or other project over a video link.

As communications technology continues to advance, modern systems can additionally capture and/or transmit spatial data associated with video and audio. Systems can derive spatial data using various photogrammetric techniques, through which 3D spatial relationships can be ascertained. Depending upon the capabilities of a capturing device, depth data may be directly measured or calculated on the fly from captured video, possibly in conjunction with spatial position sensors in the capturing device. For example, most modern smartphones are equipped with an array of sensors beyond cameras and microphones; a modern smartphone may also include depth sensing, such as a Light Detection and Ranging (LiDAR) imager or rangefinder, and motion sensing, such as multi-axis gyroscopes and accelerometers. Combined with image analysis and photogrammetry techniques, as well as techniques such as simultaneous localization and mapping (SLAM) that allow integration of depth and motion data to enable a device to both measure its environment and know its position within the environment, the array of sensors allow for the relatively accurate capture and/or calculation of depth information for a captured scene.

This depth information can be provided as a point cloud, in one approach. The point cloud in turn can be used to construct a mesh representation or model of a 3D space. The mesh representation is obtained by repeatedly connecting sets of three depth points or vertices together with edges to form a mesh of triangles that approximates the 3D space from which the depth information was obtained. The number of vertices can be less than the number of points in the point cloud so the depth information can be represented more compactly.

The depth information may be obtained by using a suitably equipped device to scan or capture the 3D space. For example, the device may include a camera capable of capturing still or video images, and depth scanning sensors. The device can be static or moved such as by panning to capture a portion, or a 360 degree view, of the space. Further, because the position of the capturing device within the 3D space can be known relative to the depth data and determined with respect to each successive frame of video simultaneously captured by the device, extracted video frames can be mapped onto the 3D mesh to create a relatively realistic approximation of the 3D space.

For example, a user in their home may capture images of cabinets and appliances in their kitchen, or images of furniture, wall hangings and other decor in a living room, for use in planning a remodeling or redecorating project.

However, the processing of the video frames is computationally intensive. For example, for indoor environment reconstructions, it is often required to completely scan the entire physical space. To scan every corner of the physical space and to avoid motion-blur artifacts, the user can move the camera slowly while scanning. Such slow movements will produce a lot of redundant data, particularly when the user scans an already scanned area.

To reduce the redundancy, selected frames referred to as key frames can be identified and used for further processing while other frames are not used. For example, a frame can be selected as a key frame when the camera has made a significant movement. While this approach is helpful, it fails to identify redundant data when the user rescans an area. This results in the need to process redundant information, e.g., for mesh applications such as texturing and mesh processing, increasing the processing time and memory requirements. Also, the above approach does not determine whether a repeated scan of an area yields more accurate depth data than the initial scan.

The techniques described herein address the above and other issues. In one aspect, video frames are processed to identify key frames while minimizing redundancy. The techniques reduce computational complexity by obtaining a sparse 3D point cloud of a 3D space and representing the point cloud by a set of voxels. Each voxel has associated data indicating, e.g., a depth and a camera viewing angle. When a new frame is processed, a new sparse 3D point cloud is obtained. For points of the new frame which are not encompassed by the existing voxels, new voxels are created. For points of the new frame which are encompassed by the existing voxels, a comparison is performed to determine whether the depth data of the new frame is more accurate than the existing depth data. In one possible approach, an accuracy metric or score is obtained which indicates the accuracy. For example, a higher score is associated with a smaller depth since the depth is expected to be more accurate when the camera is closer to an object. Also, a higher score is associated with a smaller camera viewing angle since the depth is expected to be more accurate when the camera viewing angle is smaller. A viewing angle of 0 degrees corresponds to the camera looking directly at a surface of the object. A redundancy score can be based on accuracy scores to determine whether a frame is redundant and therefore should not be a key frame.

A frame can be selected as a key frame based on various factors such as a number of new voxels which are created, a number of existing voxels for which the depth data is updated and replaced by the corresponding depth data of the new frame, and the accuracy scores. In one approach, a frame is selected as a key frame if a threshold number of new voxels is created and/or a threshold number of existing voxels is updated. A frame can be selected as a key frame if it contains a threshold level of new and/or more accurate depth information compared to existing frames.

A number of advantages are provided, including denoting redundant information with a score, providing a robust process for eliminating redundant information while rescanning, and providing a redundancy score which is configurable with reference to application type.

The above and other benefits will be further understood in view of the following.

FIG. 1 illustrates a block diagram of the components of a system 100 for capturing an image and corresponding AR data, according to various embodiments. The system 100 may include a user device 110, e.g., a capturing device, such as a smartphone, tablet, desktop or laptop computer, two-in-one (a portable computer that includes features of both tablets and laptops), hybrid, wearable computer such as smart glasses or a smartwatch, or any other computing device that can accept a camera and provide positional information, as will be discussed in greater detail herein. The device may be implemented as a computer device 1400 such as discussed in connection with FIG. 14. User device 110 further may include a camera 111 and a spatial position sensor 112 (depicted by a series of axes), which provides information about the spatial position of camera 111. It will be understood that camera 111 and spatial position sensor 112 may be contained within the body of device 110, as depicted in this example. Camera 111 is used to capture the surrounding environment of device 110, and by extension, the user. The camera can capture images of the space 105 within a field of view represented by boundary lines 111a and 111b. The environment may be a 3D space 105 such as a room, and may include one or more three-dimensional objects. In this example, the 3D space is a room which includes objects such as a framed picture 102 (e.g., a wall hanging), a window 103, a shade 104 for the window and a sofa 106.

Camera 111 may be any camera that can provide a suitable video stream for the intended purpose of user device 110. Where user device 110 is implemented as a smartphone or tablet, camera 111 may be one or more built-in cameras. In other embodiments, such as where user device 110 is a laptop, camera 111 may be built in or may be a separate, external unit. A suitable video stream may be a digital video stream, and may be compressed in embodiments using Advanced Video Codec High Definition (AVC-HD), H.264 (also known as MPEG-4 Part 10, Advanced Video Coding), MPEG-4, or another suitable compression scheme. Camera 111 may be configured to output standard or high-definition video, 4K video, or another resolution of video suitable for the intended purpose of camera 111 and user device 110. In other embodiments, the camera 111 of user device 110 may comprise multiple cameras or similar sensors, where one or more of the sensors may be configured to directly detect depth points, such as a 3D camera, LiDAR, or other suitable depth-sensing technology. In such embodiments, a point cloud of any space captured by camera 111 may be able to be at least partially obtained via direct measurement from the depth-sensing technology.

Spatial position sensor 112 may be configured to provide positional information about camera 111, such as the cameras pan and tilt. Other measured positional vectors may include camera movements, such as the camera rising or falling, or moving laterally. Spatial position sensor 112 may be implemented with micro or MEMS sensors, such as gyroscopes to measure angular movements and accelerometers to measure linear movements such as rises, falls, and lateral movements. In other embodiments, spatial position sensor 112 may be implemented using any suitable technology capable of measuring spatial movements of camera, including but not limited to depth sensors of the camera 111. In some embodiments, spatial position sensor 112 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

System 100 also includes a central server 130, with which user device 110 communicates via a communication channel 120. Central server 130 may act to receive information from user device 110 such as video and depth data, which may be used with process flow 200 or methods 300, 320, 330, 340 and 350, discussed below. In some embodiments, user device 110 may handle processing of video and depth information for a captured 3D space, including generation of a metaverse (a virtual-reality space in which users can interact with a computer-generated environment and other users), 3D mesh, and/or layout and estimation of measurements. However, depending upon the specifics of a given implementation, central server 130 may instead carry out some or all processing of the video and depth data to generate a spatial layout and estimation of dimensions of a 3D space captured by the user device 110. User device 110 may either handle a part of the processing, or simply act to acquire data about a 3D space and provide raw or partially processed data to central server 130 for further processing.

Also shown in system 100 are one or more additional user devices 140 and 150, which may be smartphones, tablets, laptops, desktops, or other servers. These additional user devices 140 and 150 may also be in data communication with the central server 130, and so may receive raw or processed data captured by user device 110 and/or a completed layout and estimation of measurements of the 3D space captured by user device 110. User devices 140 and/or 150 may be capable of interaction with the layout and estimations, as well as a generated 3D mesh or metaverse, received from central server 130. Further still, user devices 140 and 150 may engage in two-way or multi-way interaction with user device 110 through central server 130, with each device commonly working with a generated 3D mesh, metaverse, 2D or 3D layout, and/or estimates of spatial dimensions of the metaverse. It should be understood that devices 140 and 150 are merely examples, and are not indicative of the number or type of devices connected to central server 130; a given implementation may have an arbitrary number of devices connected to central server 130.

User device 110, as mentioned above, is in data communication 120 with central server 130, along with user devices 140 and 150. Data communication 120 may be implemented using any suitable data communication link technology, which may be wired, wireless, or a combination of both. Example communications technologies are discussed below with respect to FIG. 14.

FIG. 2A depicts an example high-level process flow for generating a 3D mesh and virtual reconstruction from a captured video and associated AR data, according to various embodiments. Process flow 200 may be carried out by one or more components of the system 100, in various embodiments. Initially, a video 201, or one or more images, such as an image of the space 105 of FIG. 1, is captured by an input device, such as the camera 111, along with associated motion data (not depicted). This video 201 is then, in embodiments, partially or wholly processed by the AR application programming interface (API) of the capturing device to generate AR data 202, which may be tagged to the video 201. Examples of an AR API include ARKit, an augmented reality (AR) development platform for iOS mobile devices developed by Apple Inc., and ARCore, a platform for building augmented reality experiences developed by Google LLC.

Note that, as used herein, AR data 202 is not data about AR objects. Rather, AR data 202 includes point cloud data that corresponds to video 201 that may be useful to create a 3D mesh of the captured 3D space, as well as other useful analysis, such as plane detection and semantic segmentation. Furthermore, in some embodiments, the AR API of the capturing device may include semantic segmentation as part of AR data 202.

This AR data 202 may then be used to generate a layout and/or metaverse or virtual representation of the 3D space by a mesh generator/3D scene creator 212. Finally, the mesh and/or 3D scene can be used to generate a full 3D mesh 214, which includes one or more frames from the video 201 (and/or other sources of relevant images) mapped upon the 3D mesh 214 to generate a relatively realistic model. Additionally, an abstract video 216, which may comprise a layout or metaverse model of the scene captured by the camera 111, may be generated from the detected points in the point cloud. The model can then be used in an interactive fashion.

AR data 202 may be captured contemporaneously with and/or extracted from, video 201, and may be tagged to video 201. AR data 202 may include AR feature point data 204, depth data from the sensor 206, motion data from spatial sensors 112 (shown in FIG. 1), predicted depth data 208, and/or disparity maps 210. Other embodiments may include additional data types, different data types, or fewer data types. The various types of AR data 202 may be derived from various raw data inputs, including Red-Green-Blue (RGB) images (such as the sequence of frames of video 201), intrinsic camera parameters and/or camera transform data (such as from camera 111 and/or spatial position sensor 112), 3D feature points, and/or depth images from a depth sensor (LiDAR, stereo camera, etc.), among other types of possible data. RGB images may be extracted from frames of the video captured by camera 111. An RGB image defines red, green, and blue color components for each individual pixel of the image.

Intrinsic parameters of a camera are parameters that are internal and fixed to a particular camera. These parameters characterize the optical, geometric, and digital characteristics of the camera and may include: (1) the perspective projection (e.g., focal length), (2) the transformation between image plane coordinates and pixel coordinates, and (3) the geometric distortion introduced by the optics.

In addition to motion data from spatial position sensor 112, intrinsic camera parameters can include various known or readily determined properties of camera 111, such as focal length, aperture, optical center, angle of view, focal point, etc. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 111 is focused relatively far away from the camera position, and/or the camera 111 utilizes a small aperture (relatively high f-stop, such as f/8, f/11, etc.), so as to offer a large depth of field.

Camera transforms can include the various variables necessary to transform between the 3D objects within the field of view of camera 111 and the 2D image plane of the camera 111. Such variables can include information about the spatial location of the capturing device. 3D feature points can include feature points which can be used by the AR API to create the AR feature point data 204, and may be extracted from video 201, such as various anchor points or features, and/or captured using one or more sensors that are separate from video 201, such as spatial position sensor 112. Depth images can include imaging captured by a depth-sensitive device, such as a LiDAR sensor or infrared range finder, to allow for direct, and potentially more precise, depth measurements of various points within the scene captured by camera 111. Where direct depth measurements are available, data similar to that available for camera 111 may be used (e.g., intrinsic camera parameters and camera transforms) to process the depth measurements and correlate with the images from camera 111.

AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 112 or a depth-sensitive device. Identified features including edges, points, and planes may be used to create a 2D or 3D layout and/or metaverse. Further, these feature points may correspond to segmented portions of the captured 3D scene, such as distinguishing a wall, window, picture, or other planar feature from identified planes such as walls, floor, ceiling, etc.

Depth data from sensor 206 may include the direct depth measurements, which may be correlated with identified AR feature point data 204 by the AR API. Corollary to or alternative to depth data from sensor 206 includes predicted depth data 208, which the AR API may derive from techniques such as machine learning, and/or photogrammetry and comparison between proximate frames of the captured video. The depth data from the sensor 206 and the predicted depth 208 may comprise a point cloud that, when interconnected, comprises a 3D mesh, with the points forming the vertices of the mesh polygons such as triangles.

Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/3D scene creator 212 receives the AR data 202 and uses it to generate a 3D mesh, which may then be output as a full 3D mesh 214 and/or an abstract video 216, or layout and/or metaverse. The resulting output from the mesh generator/3D scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. The full 3D mesh 214 provides a geometric representation of the captured 3D space. The full 3D mesh 214 can be used for various purposes, such as simulating physical interactions with objects in the 3D space represented by the full 3D mesh 214, taking measurements of the represented environment, later exploration or walkthrough, or another suitable purpose.

An abstract video 216 can also be output, which may be or include a virtual representation such as a metaverse, and/or a 2D or 3D layout. As with the full 3D mesh 214, such a layout or virtual representation reflects the physical geometry of the captured 3D space, and may include measurements of the captured space that reflect the actual physical dimension of the captured 3D space. In this respect, the virtual representation/layout/metaverse is equivalent in physical dimensions to the captured 3D space, albeit as a digital representation.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL (hue, saturation, lightness), CMYK (cyan, magenta, yellow, and key), or another method of expressing color, in alternative embodiments. In still other embodiments, the image information may comprise black and white or greyscale information, with no color information. Further still, other embodiments may utilize a combination of color and greyscale/black and white images.

FIG. 2B depicts an example set of video frames 250 in which selected frames 251 and 257 are key frames, according to various embodiments. As mentioned, key frames are frames which contain relevant information which is not substantially redundant with previous frames. Key frames can have redundant information but also contain new information. For example, when obtaining video images and depth data of a 3D scene for use in generating a mesh model of the scene, key frames are frames which contain information which is helpful in generating the mesh model. Key frames are frames in which the camera/depth sensor sees the scene from different perspectives. A key frame can be selected when the camera/depth sensor looks at new area of a 3D space for the first time, or when the camera/depth sensor looks at an area which was already looked at, but from a better (closer) distance and better (more direct) point of view.

By selecting a subset of all frames as key frames for use in generating the mesh model or other processing, and omitting other frames, the process is made more efficient.

In this example, a set of video frames 250 includes frames 251-258 and frames 251 and 257 are selected as key frames.

Figure 3A:
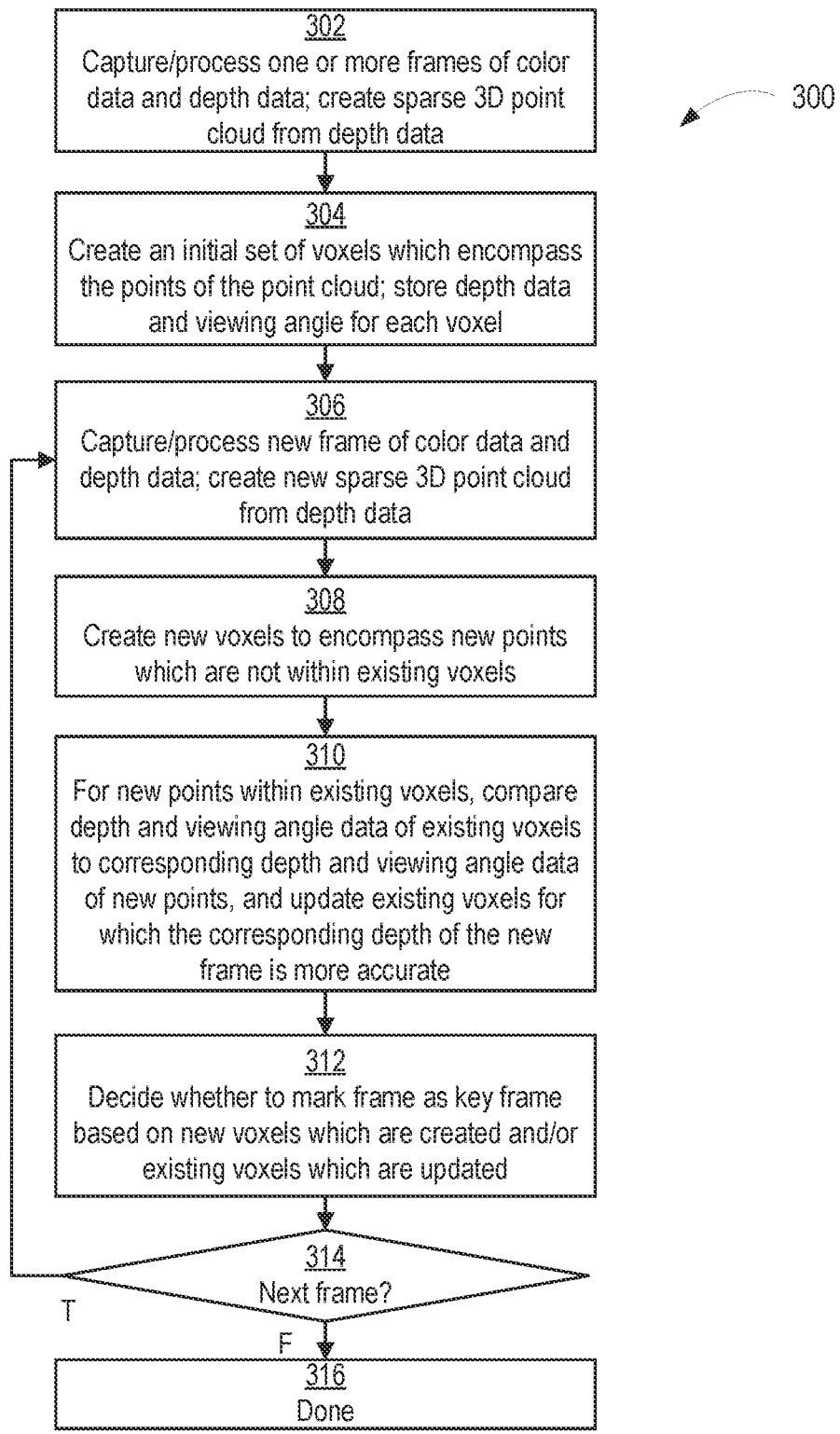
FIG. 3A is a flowchart of the operations of an example method for identifying key frames in a sequence of video frames, according to various embodiments.

FIG. 3A is a flowchart of the operations of an example method for identifying key frames in a sequence of video frames, according to various embodiments. Various embodiments may implement some or all of the operations of method 300, and each of the operations of method 300 may be performed in whole or in part. Some embodiments may add or omit additional operations, or may change the order of operations as may be appropriate for a given implementation. Method 300 may be carried out in whole or in part by one or more components of system 100.

As mentioned, scanning a 3D space can result in a significant amount of redundant data which does not help in generating a mesh model to represent objects in the space. The techniques disclosed herein reduce the redundancy by representing the depth data of the objects with a grid of voxels, and updating the depth data of the voxels as the user scans the space with a camera. The voxel can be a cube or other 3D shape which occupies a defined volume in physical space. Moreover, the size of the voxel is configurable, such that a smaller size results in a higher resolution, where a larger number of voxels are used to represent a mesh. At each voxel, data used to create the voxel is stored.

The details of the method can be understood by briefly referring to FIG. 4A to 4F, described in further detail below. The method involves sparse 3D point clouds such as point clouds 480, 485 and 490 in FIGS. 4A, 4C and 4D, respectively, where each dark circle or square represents a point. The method also involves sets of voxels such as in FIGS. 4B and 4C. For example, FIG. 4E depicts existing voxels 420 including potentially updated voxels 425, and new voxels 430. FIG. 4F depicts a table of data for the points and voxels.

Operation 302 includes capturing/processing one or more frames of color data and depth data, and creating a sparse 3D point cloud from the depth data. For example, see the sparse 3D point cloud 480 of FIG. 4A. Typically, a depth value is obtained for each pixel in a frame, where there are multiple rows of pixels. A sparse 3D point cloud is obtained by down sampling, such as by using every fifth or tenth pixel in each row of a frame and/or by using every fifth or tenth row in a frame. In one option, for better reconstruction, any point having a depth which exceeds a specified maximum or other predetermined threshold is eliminated.

The video may comprise RGB data. The color data and depth data can be captured concurrently. The RGB frames can be used to render texture on a mesh model. The captured video may come from a variety of sources. In some examples, a camera attached to or integrated with a capturing device, such as user device 110 with camera 111, is used to capture the video. In other examples, a different device or devices may be used to capture the video that are separate from the capturing device. The depth data may come from, in some examples, other sensors as described above with respect to FIGS. 1 and 2, such as spatial position sensor 112 on a user device 110. In embodiments, the video and depth data are captured contemporaneously to ensure appropriate association between the depth data and corresponding video frames. The video and associated depth data may be captured at a previous time, and stored into an appropriate file format that captures the video along with the raw feature points and motion data. Various operations of method 300 may then be performed on the stored video and associated data in post-processing.

Operation 304 includes creating an initial set of voxels which encompass the points of the point cloud, and storing depth data and a viewing angle for each voxel. Generally, the voxels are sized such that one or more points fall within each voxel. Each point of a point cloud therefore falls within a voxel. Each voxel can be represented by a single point having an associated depth and viewing angle. When multiple points fall within a voxel, the single representative point can be determined, e.g., by averaging. See FIG. 12B, for example. The representative point can be thought of as being at the center of the cube that forms the voxel, as a simplification. In another approach, the representative point can be thought of as being at another specified location such as a particular corner of the cube.

For example, see the initial set of voxels 495 of FIG. 4B which encompass the points of the point cloud 480. Here, a single representative point is shown for each voxel where that point has an associated depth and viewing angle. For simplification, the representative points are depicted in the same location within each voxel.

Operation 306 includes capturing/processing a new frame of color data and depth data, and creating a new sparse 3D point cloud from depth data. For example, see the new sparse 3D point cloud 485 of FIG. 4C.

Operation 308 includes creating new voxels to encompass new points which are not within the existing voxels. For example, see the set of new voxels 430 of FIG. 4E which encompass the points 413-415. A new point is at a location which does not fall within an existing voxel. Typically, the new points will include points that fall within the existing voxels and within a region which is very close to the existing voxels, such that the new voxels include voxels which are adjacent to the existing voxels. Other new voxels will typically extend contiguously from these new voxels which are adjacent to existing voxels, so that all voxels extend contiguously. In theory, some new voxels could be non-adjacent to existing voxels, in an isolated set of voxels. For uniformity and reduced complexity, the new voxels can have the same size as the existing voxels.

Operation 310 includes, for new points within the existing voxels, comparing depth and viewing angle data of existing voxels to corresponding depth and viewing angle data of new points, and updating the existing voxels for which the corresponding depth data of the new frame is more accurate. This process will be described in greater detail with respect to FIG. 3B, below. See also FIGS. 4D and 4E, where the new points 410, 411 and 412 are within the existing voxels V3, V6 and V9, respectively. In V3, the depth data is compared for the points 403 and 410. In V6, the depth data is compared for the points 406 and 411. In V9, the depth data is compared for the points 409 and 412. See also the data table of FIG. 4F. Each voxel involved in a comparison can have a representative point with a depth and viewing angle which are used in the comparison.

Operation 312 includes deciding whether to mark the new frame as a key frame based on the new voxels which are created and/or the existing voxels which are updated. See FIG. 3F, for example. The initial frame in a video sequence can also be identified as a key frame. A frame can be marked as a key frame by storing data indicating it is a key frame. For example, for a sequence of video frames, a table or other data structure can store identifiers of the key frames.

A decision operation 314 determines whether there is a next frame to process. If the decision operation is true (T), operation 306 is reached to capture and process a new frame. If the decision operation is false (F), the process is done at operation 316. The end of a video sequence is reached.

After the video sequence is processed, the key frames can be used for various purposes such as generating a 3D mesh representation of the 3D space. In this case, the point clouds of depth data associated with the key frames are selected. For example, a cloud of points each with positional data in three dimensions with respect to a predetermined reference, can be obtained from the captured video and depth data, also as described with respect to FIGS. 1 and 2. The point cloud may be processed to generate a 3D mesh, such as by repeatedly connecting each of the points in the point cloud into groups of three to form a mesh of triangles. See the example mesh model 711 of FIG. 7B, for example. Each of the points then becomes a vertex for one or more triangles, with edges of the various triangles formed by the connection between two adjacent points. In some embodiments, the depth points or the 3D mesh may be at least partially obtained using simultaneous localization and mapping (SLAM), or another suitable technique, which may be carried out on the device by the AR API. SLAM is the computational problem of constructing or updating a map of an unknown environment while simultaneously keeping track of the location of an agent, e.g., camera, within it.

In embodiments where the video is provided as a file from a past capture, the depth data may be stored with the video, and correlated to each video frame. In other embodiments, the depth data may be calculated from a raw video using photogrammetric techniques.

Depending upon the capabilities of an implementing system or device, the operations may be performed progressively while the video is being captured, or may be performed on a complete captured video and associated depth data, such as when the user plays back a video of the 3D space on the device 110. Note that the frames can be processed in the time order in which they are captured, or in a different order.

FIG. 3B is a flowchart of the operations of an example method 320 for comparing and updating existing voxels in operation 310 of FIG. 3A, according to various embodiments. Operation 322 includes determining the accuracy of the depth for an existing voxel based on the depth and the viewing angle. Operation 323 includes determining the accuracy of the depth for a point of a new frame encompassed by the existing voxel based on the depth and the viewing angle. See also FIGS. 3C1 and 3C2. For example, accuracy metrics for a depth value can be based on both the depth value itself and the viewing angle, and these metrics can be compared for two points. An accuracy metric can range from 0-1, for example, where 1 is the highest accuracy and 0 is the lowest. A decision operation 324 determines whether the accuracy of the depth data is better for a corresponding point of a new frame, e.g., better than the accuracy of the depth data of the existing voxel. If the decision operation 324 is true, operation 326 includes replacing the existing depth and viewing angle for the existing voxel with the depth and viewing angle of the corresponding point of the new frame. In this case, the data of the voxel is updated by the new frame. Note that the point of the new frame which is used to update a voxel can be anywhere within the existing voxel. The existing voxel remains in the same place when it is updated, in one approach. The method is then done at operation 328. If the decision operation 324 is false, the method is done at operation 328, and the data of the voxel is not updated by the new frame.

FIG. 3C1 is a flowchart of an example method 330 for determining an accuracy metric for an existing voxel, consistent with operation 322 FIG. 3B, according to various embodiments. Operation 332 includes determining a first accuracy metric for an existing voxel based on the depth. See FIG. 3D, for example. Operation 334 includes determining a second accuracy for the existing voxel based on the camera viewing angle. See FIG. 3E, for example. Operation 336 includes determining an overall accuracy metric for the existing voxel based on the first and second accuracy metrics. For example, the overall accuracy metric can be based on a sum or multiplication of the first and second accuracy metrics, or other linear or non-linear function of the first and second accuracy metrics. The first and second accuracy metrics can have the same or different weights in the determination of the overall accuracy metric.

As mentioned, accuracy can be based on factors such as depth, where a smaller depth is associated with a higher accuracy since the camera is closer to an object where it can obtain a stronger signal reflection to more accurately determine depth. Also, a higher accuracy is associated with a smaller camera viewing angle when the camera is looking directly at a surface of the object. For example, as the user moves a camera around a 3D space, a given object can be captured from a large range of distances and viewing angles. The depth represents a distance between the camera and the object, and the viewing angle represents a deviation between the direction the camera is pointed and a normal direction of a portion of the surface of the object, or of a face of the mesh model, which is intersected by the direction the camera is pointed, in one approach. See also FIG. 13.

FIG. 3C2 is a flowchart of an example method 340 for determining an accuracy metric for a point of a new frame which is encompassed by an existing voxel, consistent with operation 323 of FIG. 3B, according to various embodiments. Operation 342 includes determining a first accuracy metric for a point of a new frame which is encompassed by an existing voxel. See FIG. 3D, for example. Operation 344 includes determining a second accuracy for the point of a new frame which is encompassed by an existing voxel based on the camera viewing angle. See FIG. 3E, for example. Operation 346 includes determining an overall accuracy metric for the point of a new frame which is encompassed by an existing voxel based on the first and second accuracy metrics. For example, the overall accuracy metric can be based on a sum or multiplication of the first and second accuracy metrics, or other linear or non-linear function of the first and second accuracy metrics. The first and second accuracy metrics can have the same or different weights in the determination of the overall accuracy metric.

Figure 3D:
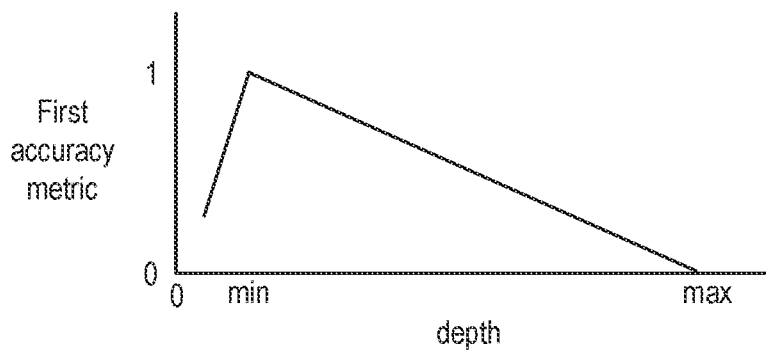
FIG. 3D is an example plot of a first accuracy metric versus a depth, for use in operations 332 and 342 of FIGS. 3C1 and 3C2, respectively, according to various embodiments.

FIG. 3D is an example plot of a first accuracy metric versus a depth, for use in operations 332 and 342 of FIGS. 3C1 and 3C2, according to various embodiments. The accuracy metric can range from 0 to 1, as discussed, in one possible approach. The depth ranges between a minimum (min) and a maximum (max). For indoor use, depending on the capturing device, the minimum value could be 1-2 feet while the maximum is 6-10 feet, for example. If the capturing device is closer than the minimum distance, the accuracy drops. Similarly, the accuracy decreases as the depth increases. The decrease is linear in this example but could be nonlinear. The depth data can be omitted if the depth is outside a desired range.

Figure 3E:
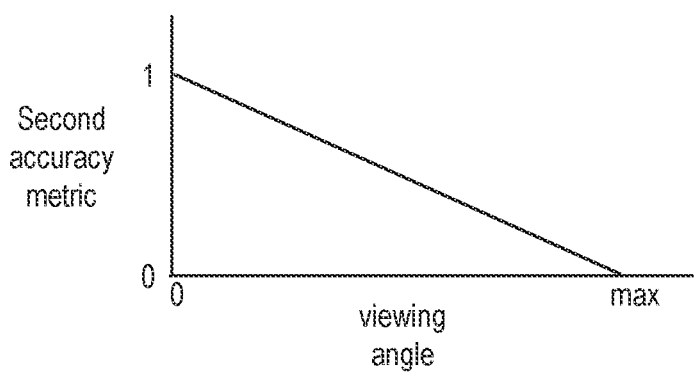
FIG. 3E is an example plot of a second accuracy metric versus a viewing angle, for use in operations 334 and 344 of FIGS. 3C1 and 3C2, respectively, according to various embodiments.

FIG. 3E is an example plot of a second accuracy metric versus a viewing angle, for use in operations 334 and 344 of FIGS. 3C1 and 3C2, respectively, according to various embodiments. The viewing angle ranges between 0 and a maximum (max). The accuracy metric decreases as the viewing angle increases. The decrease is linear in this example but could be nonlinear. The maximum viewing angle depends on the capturing device, but could be 80 degrees, for example. The viewing angle data can be omitted if the viewing angle exceeds a desired maximum.

Another approach to selecting key frames involves a redundancy score. An example operation is as follows:

Step 1: dmax=maximum depth distance, e.g., 6 feet
   dmin=maximum depth distance, e.g., 1 feet
   do=observed depth distance
   db=(dmax−dmin−do)/(dmax−dmin) (better depth score, 0≤db≤1)

Step 2: vamax=maximum viewing angle, e.g., 80 degrees
   vao=observed viewing angle
   vab=(vamax−vao)/vamax (better viewing angle score, 0≤vab≤1)

Step 3: vs=db×vab (score at existing voxel)

Step 4: Sev=sum of vs over all existing voxels (score for existing voxels, vs>vsth, Sev≤0).

Step 5: Redundancy score R=(count of new voxels created)+Sev.

A frame is then selected as a key frame when R is greater than a threshold such as one or more.

Figure 3F:
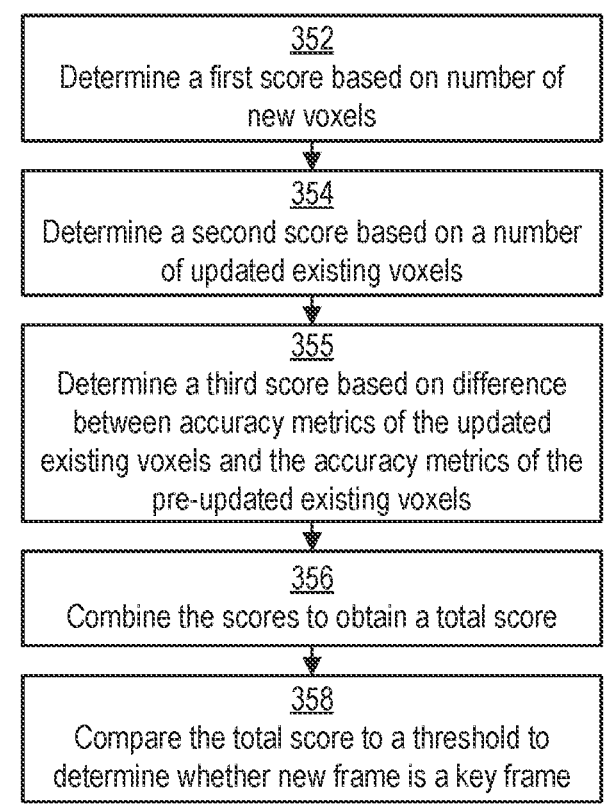
FIG. 3F is a flowchart of the operations of an example method 350 for deciding whether to mark a frame as a key frame in operation 312 of FIG. 3A, according to various embodiments.

FIG. 3F is a flowchart of the operations of an example method 350 for deciding whether to mark a frame as a key frame in operation 312 of FIG. 3A, according to various embodiments. Operation 352 includes determining a first score based on a number of new voxels for a new frame. For example, the score could be the same as the number of new voxels. Or the score can be 1 if the number of new voxels exceeds a threshold number, e.g., one or more, or 0 if the number of new voxels does not exceed the threshold number. Other approaches are possible.

Operation 354 includes determining a second score based on the number of updated existing voxels. For example, the score could be the same as the number of updated existing voxels. Or the score can be 1 if the number of updated existing voxels exceeds a threshold number, e.g., one or more, or 0 if the number of updated existing voxels does not exceed the threshold number. Other approaches are possible.

Operation 355 includes determining a third score based on a difference between accuracy metrics of the updated existing voxels and accuracy metrics of the pre-updated voxels. The accuracy metric of an updated existing voxel is the accuracy metric of the point of the new frame which is used to update the voxel. The accuracy metric of the pre-updated existing voxel is the accuracy metric of the existing voxel before being updated by the point of the new frame. Essentially, the amount or delta by which the accuracy metric is improved for a voxel can be determined and these deltas can be summed across the updated voxels for a new frame to obtain an accuracy delta for the frame. If the accuracy delta for the frame is improved by only a relatively small amount, e.g., less than a threshold, it may be concluded that the new frame does not qualify as a key frame. On the other hand, if the accuracy delta for the frame is improved by a relatively large amount, e.g., more than a threshold, it may be concluded that the new frame qualifies as a key frame. Operation 355 generally involves assigning a score based on a difference between an accuracy metric associated with the new frame of depth data and an accuracy metric associated with the existing set of voxels, wherein the deciding whether to mark the new frame as the key frame is based on the difference.

For example, in FIG. 4F, the sum of the accuracy metrics for the pre-updated voxels is M3+M6+M9 and the sum of the accuracy metrics for the points 410-412 is M3A+M6A+M9A. The accuracy delta for the frame is therefore (M3A+M6A+M9A)-(M3+M6+M9).

Operation 356 includes combining the scores to obtain a total score. One or more of the first, second and third scores can be used, for example. The scores can be combined in various ways, such as by adding or multiplying together. Some of the scores can be assigned higher weights than other scores to represent their relative importance.

Operation 358 compares the total score to a threshold to determine whether the new frame is a key frame. For example, the new frame can be designated as a key frame if the total score is greater than a threshold score. In one approach, each of the scores ranges from 0 to 1, where 0 represents the lowest accuracy and 1 represents the highest accuracy.

In a simplified option, a frame is selected as a key frame if there are one or more voxels which are new and/or updated.

The thresholds can be adjusted to provide a larger or smaller number of key frames. In one approach, a video sequence is processed with a first set of thresholds and a number of resulting key frames is noted. If the number is below a desired level, the video sequence can be processed again but with lower thresholds, to allow more key frames to be identified. If the number is above a desired level, the video sequence can be processed again but with higher thresholds, to allow fewer key frames to be identified. This option is possible only in an offline key frame selection process, where all the data is already saved.

FIG. 4A depicts an example of an existing sparse 3D point cloud 480, consistent with operation 302 of FIG. 3A, according to various embodiments. The example includes nine points 401-409 in a 3D space 400. Although illustrated in two dimensions, a person skilled in the art will understand that each of the points includes a depth component for an x, y, and z location.

FIG. 4B depicts an example of a set of voxels 495 which encompass the points of the point cloud of FIG. 4A, according to various embodiments. Each points is encompassed within a respective voxel. For example, points 401-409 are encompassed within voxels V1-V9, respectively. Voxels are typically uniform cubes which are arranged in a grid, e.g., in rows and columns. For the sake of simplicity, the voxels 495 are illustrated in a two-dimensional grid. It should be understood that the voxels 495 would actually be arranged in three dimensions, with height, width, and depth. One convention is for the voxels to be arranged in horizontal rows and/or vertical columns. Moreover, the voxels can be arranged adjacent to one another in vertical and horizontal directions. The voxels can have a specified uniform size such as 5 cm. square. In other approaches, different sized voxels could be used.

FIG. 4C depicts an example of a new sparse 3D point cloud 485, consistent with operation 306 of FIG. 3A, according to various embodiments. The point cloud includes points 410-415.

FIG. 4D depicts an example of the point clouds of FIGS. 4A and 4C combined, according to various embodiments. In the 3D space 400, it can be seen that the points 403, 406 and 409 are relatively close to points 410, 411 and 412, respectively. As a result, the new points 410-412 are encompassed within the existing voxels V3, V6 and V9, respectively, as depicted in FIG. 4E. In contrast, the new points 413-415 are not encompassed within any of the existing voxels so that new voxels V10-V12, respectively, are created for them, as depicted in FIG. 4E.

FIG. 4E depicts an example of new voxels V10-V12 which encompass new points which are not within the existing voxels of FIG. 4B, consistent with operation 308 of FIG. 3A, and other new points which are within existing voxels V3, V6 and V9, according to various embodiments. The new points 410-412 are encompassed within the existing voxels V3, V6 and V9, respectively, as mentioned. Generally, a voxel encompasses a volume in the 3D space which can be expressed, e.g., in a Cartesian coordinate system as a range of x, y and z values. The position of a point in a point cloud can similarly be represented by x, y and z coordinates in the 3D space, in one approach. Other coordinate systems could be used as well. A point is encompassed within a voxel when the point falls within the volume represented by the range of x, y and z values of the voxel.

The new points 413-415 are not encompassed by the existing voxels V1-V9 so that new voxels V10-V12 are created for them. The set of new voxels 430 are in a column which is adjacent to a column formed by the existing voxels V3, V6 and V9. Further, voxels V10, V11 and V12 are in common row with, and adjacent to, V3, V6 and V9, respectively.

FIG. 4F depicts a table of data including voxel id and associated depth, viewing angle (VA) and accuracy metric (M), in addition to encompassed points (EPs) and associated depth, viewing angle and accuracy metric, consistent with FIG. 4A to 4E, and according to various embodiments. The table of data can be maintained, e.g., in a computing system which could be incorporated into the capturing device and/or a remote server. Generally, data is maintained for each voxel. The data can include depth, representing the distance between the voxel and the capturing device at the time the depth is obtained. For a voxel, the distance can be based on the depths of one or more points which fall within the voxel. See also FIG. 12A to 12C. The data can further include a viewing angle (VA) of the capturing device to the voxel. In some approaches, an accuracy metric (M) can be determined, e.g., based on the depth and viewing angle, such as discussed in connection with FIGS. 3C1 and 3C2.

When depth data of a new frame is being compared to depth data of the existing voxels, the table further includes identifiers of the encompassed points (EP) (the points of the new frame encompassed by the existing voxels), and associated data, including the depth, viewing angle and accuracy metric.

In this example, the voxels V1-V9 which encompass points 401-409, respectively, are listed along with the new voxels V10-V12 which encompass points 413-415, respectively. V1-V12 have depths D1-D12, respectively, and viewing angles VA1=VA12, respectively. Furthermore, a comparison is performed consistent with operation 310 of FIG. 3A for V3, V6 and V9, so that accuracy metrics M3, M6 and M9, respectively, are determined for these voxels.

The encompassed points are 410, 411 and 412. The data associated with the point 410 includes a depth D3A, a viewing angle VA3A and an accuracy metric M3A. The data associated with the point 411 includes a depth D6A, a viewing angle VA6A and an accuracy metric M6A. The data associated with the point 412 includes a depth D9A, a viewing angle VA9A and an accuracy metric M9A.

For the voxels V3, V6 and V9, a comparison is made between the metrics M3 and M3A, M6 and M6A, and M9 and M9A, respectively. In one approach, a larger metric represents a greater accuracy. Based on the comparison, a determination can be made as to whether the accuracy of the depth of the new point is greater than the accuracy of the depth associated with the voxel. If the depth of the new point is more accurate, the depth of the voxel is updated with, e.g., replaced by, the depth of the new point. The voxel is also updated with other associated data of the new point such as the viewing angle. For example, for V3, if D3A is more accurate than D3, e.g., M3A>M3, then D3 is replaced by D3a. If D3A is not more accurate than D3, then D3 continues to represent the depth of the voxel.

Note that the accuracy metric is not depicted for every voxel as it may only be determined for voxels in which a comparison is performed, in one approach, to reduce complexity.

Figure 5:
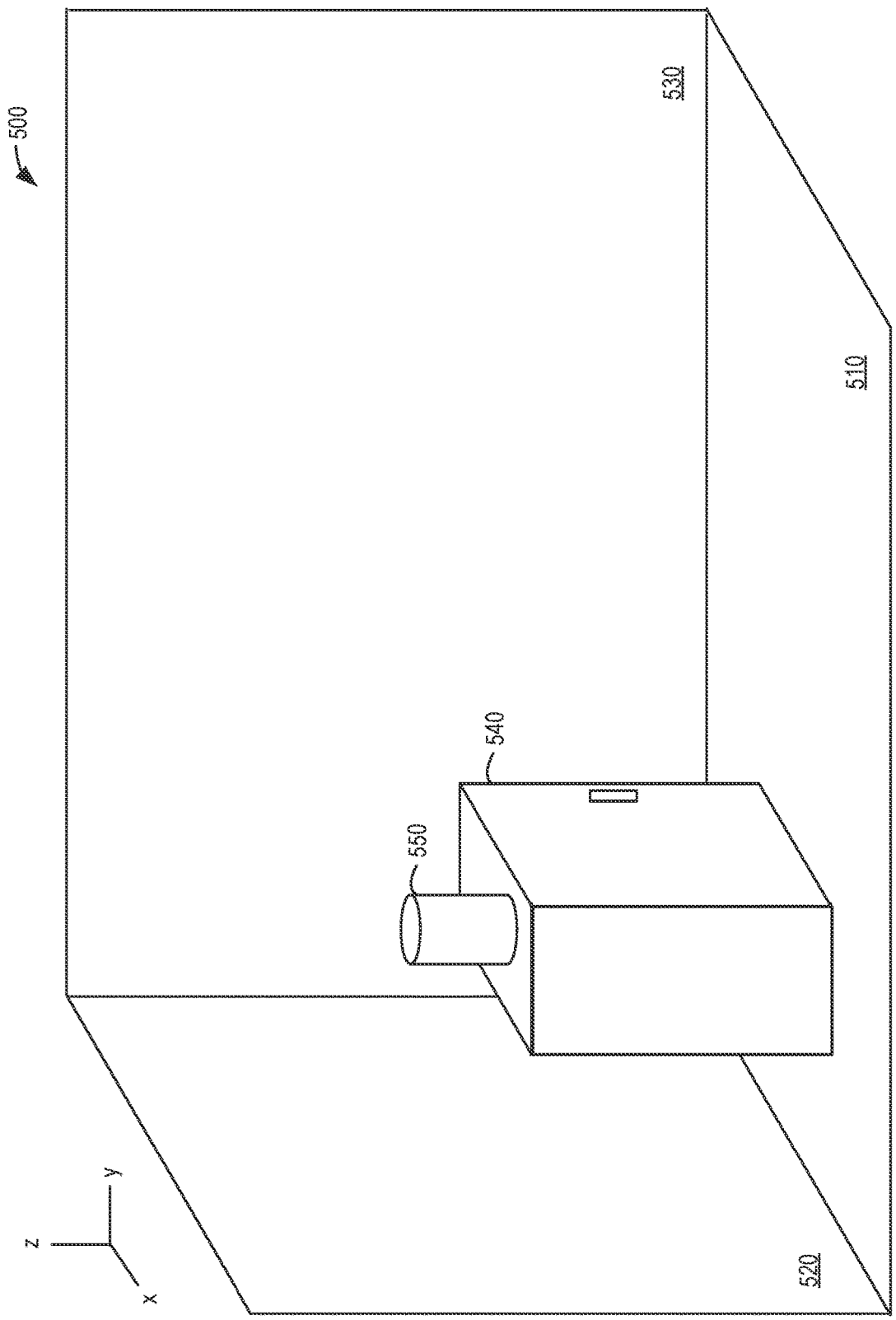
FIG. 5 depicts an example view of a 3D space 500 for use with the method of FIG. 3A, according to various embodiments.

FIG. 5 depicts an example view of a 3D space 500 for use with the method of FIG. 3A, according to various embodiments. The 3D space is a room which includes a floor 510, a back wall 520 and a side wall 530 and objects such as a cabinet 540 and a vase 550. The cabinet is hexahedral and the vase is cylindrical. A coordinate system represents x, y and z axes. The view is offset from a central view of the objects.

Figure 6:
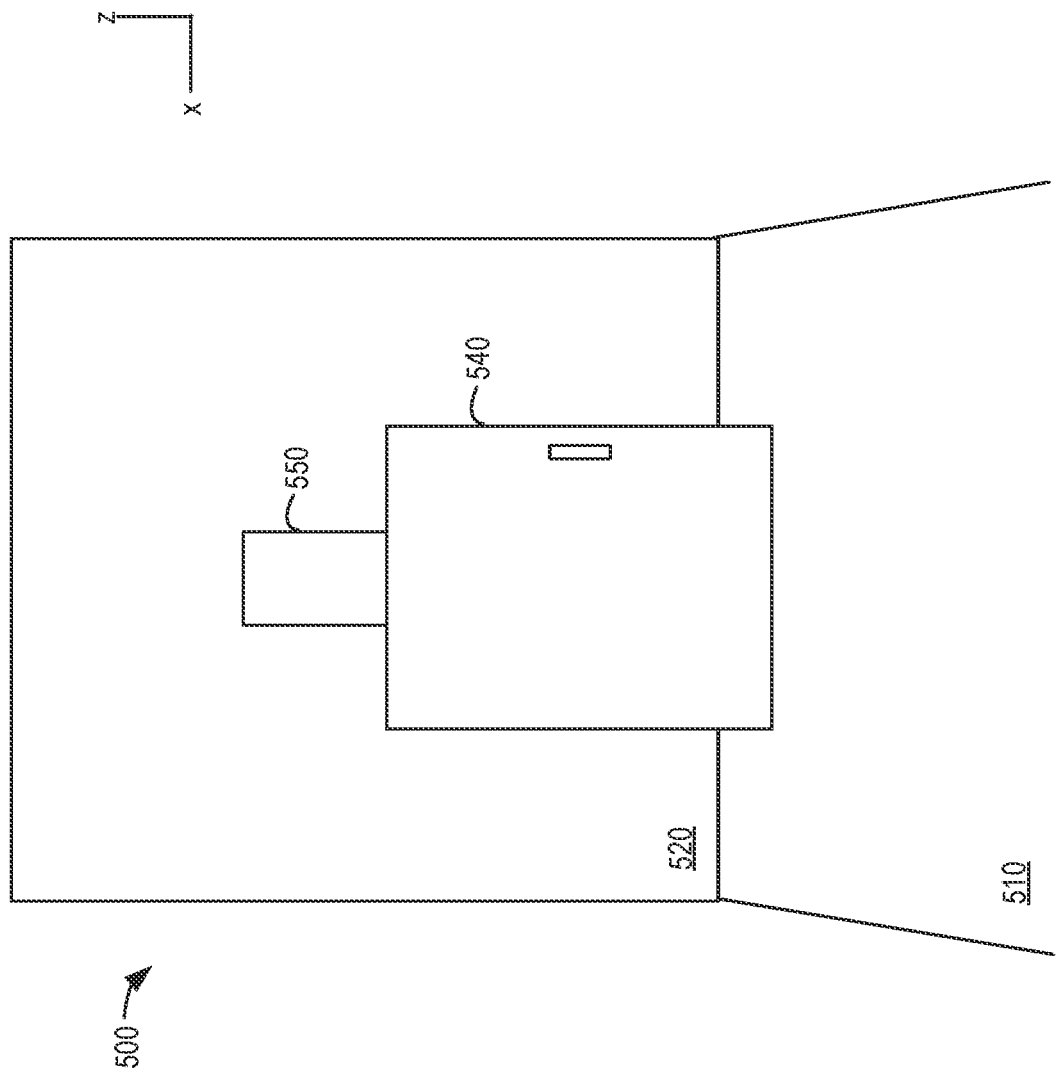
FIG. 6 depicts another example view of the 3D space 500 of FIG. 5, according to various embodiments.

FIG. 6 depicts another example view of the 3D space 500 of FIG. 5, according to various embodiments. The view is head on, looking directly at the objects in the −y direction. The floor 510 and back wall 520 are also depicted. The viewpoints of FIGS. 5 and 6 are example viewpoints of the object which the capturing device can capture when the user moves the capturing device around the room.

FIG. 7A depicts an example sparse 3D point cloud 700 consistent with the view of FIG. 6 and the method of FIG. 3A, operation 302, according to various embodiments. Each point of the point cloud is represented by a black circle. The points extends in uniform rows and columns as a simplification. A portion 700a of the point cloud represents the vase and a portion 700b of the point cloud represents the cabinet. The points extend along the front surfaces of the cabinet and the vase. These are portions of the objects which are in the field of view of the capturing device.

As mentioned, the points can be used to generate a 3D mesh model of the objects. In one approach, the points are connected to form triangles, where the points are vertices of the triangles. Each triangle is a face which represents a portion of the surface of an object. For example, the portion 710 of the point cloud can be used to form a portion of a mesh model as depicted in FIG. 7B.

FIG. 7B depicts an example mesh model 711 corresponding to a portion 710 of the sparse 3D point cloud 700 of FIG. 7A, according to various embodiments. The nine points are vertices, including an example vertex 714, which form eight triangles, including an example triangle 715. The mesh model is built up over time from the points of key frames.

Figure 8:
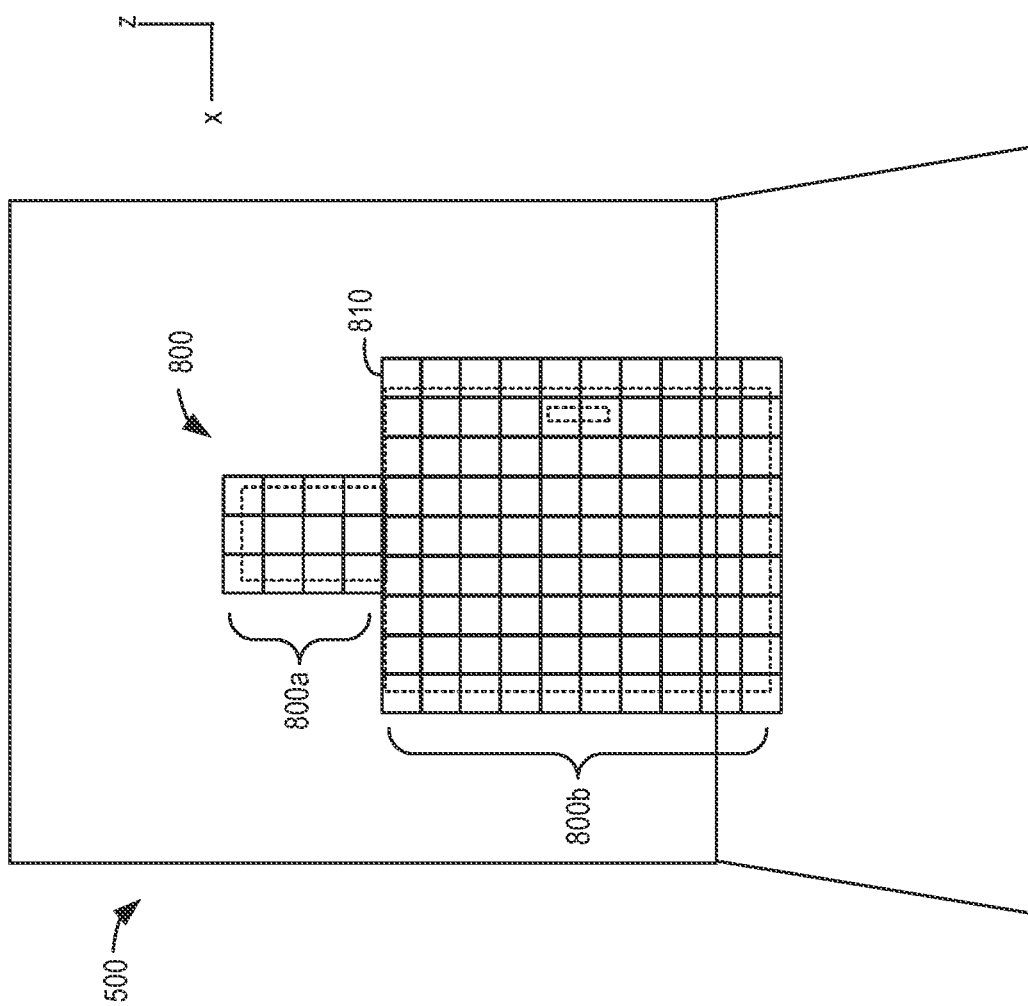
FIG. 8 depicts an example of a set of voxels 800 which encompass the points of the sparse 3D point cloud of FIG. 7A, consistent with operation 304 of FIG. 3A, according to various embodiments.

FIG. 8 depicts an example of a set of voxels 800 which encompass the points of the sparse 3D point cloud of FIG. 7A, consistent with operation 304 of FIG. 3A, according to various embodiments. A subset 800a of the set of voxels encompasses the portion 700a of the point cloud of FIG. 7, and another subset 800b of the set of voxels encompasses the portion 700b of the point cloud of FIG. 7. An example voxel 810 encompasses the point 714 of FIG. 7B.

Figure 9:
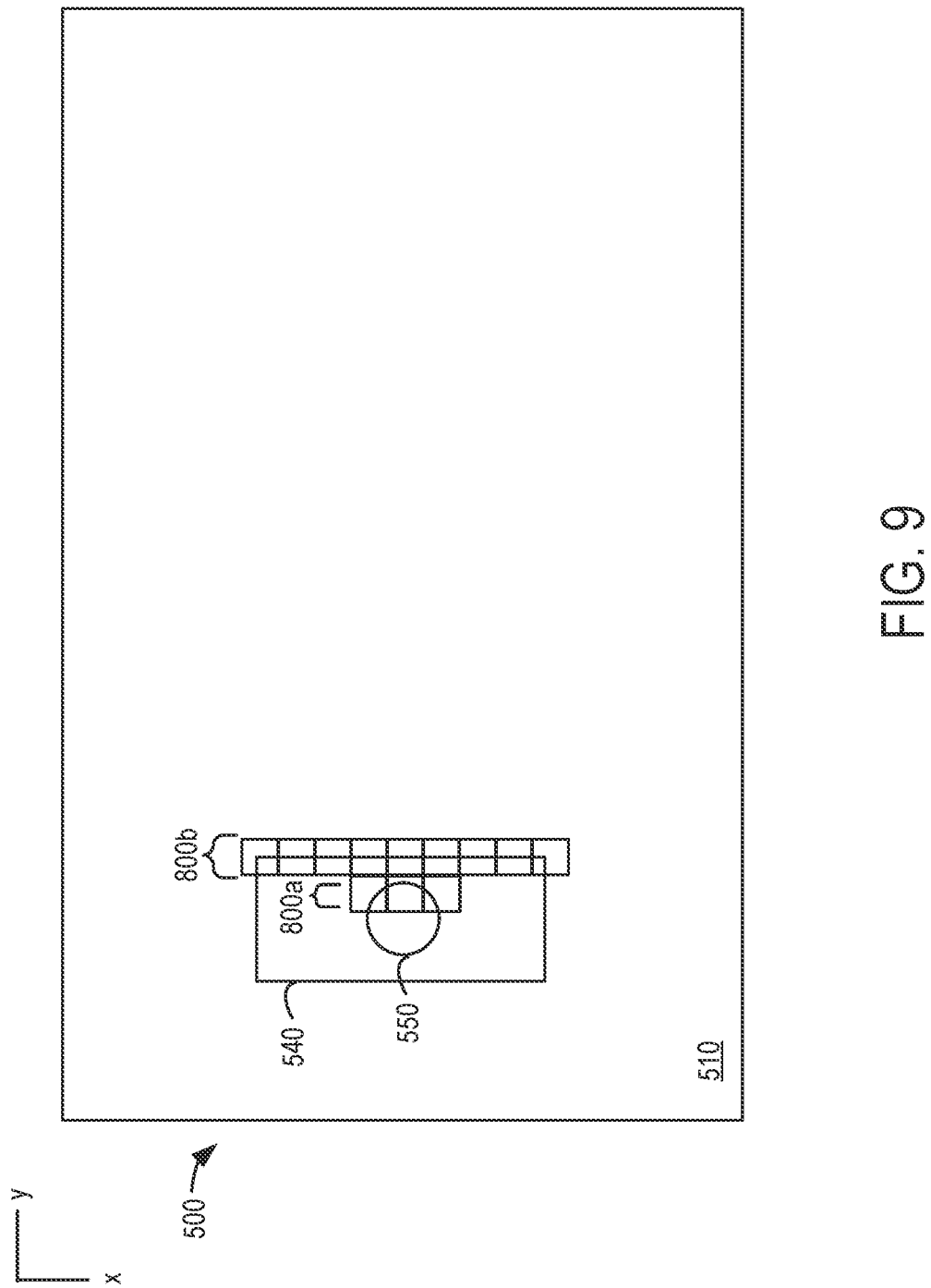
FIG. 9 depicts an example of the voxels of FIG. 8 from an overhead view, according to various embodiments.

FIG. 9 depicts an example of the voxels of FIG. 8 from an overhead view, according to various embodiments. The subset 800b of the voxels extend along the planar front surface of the cabinet 540 and the subset 800a of the voxels extend along the cylindrical front surface of the vase 550.

Figure 10:
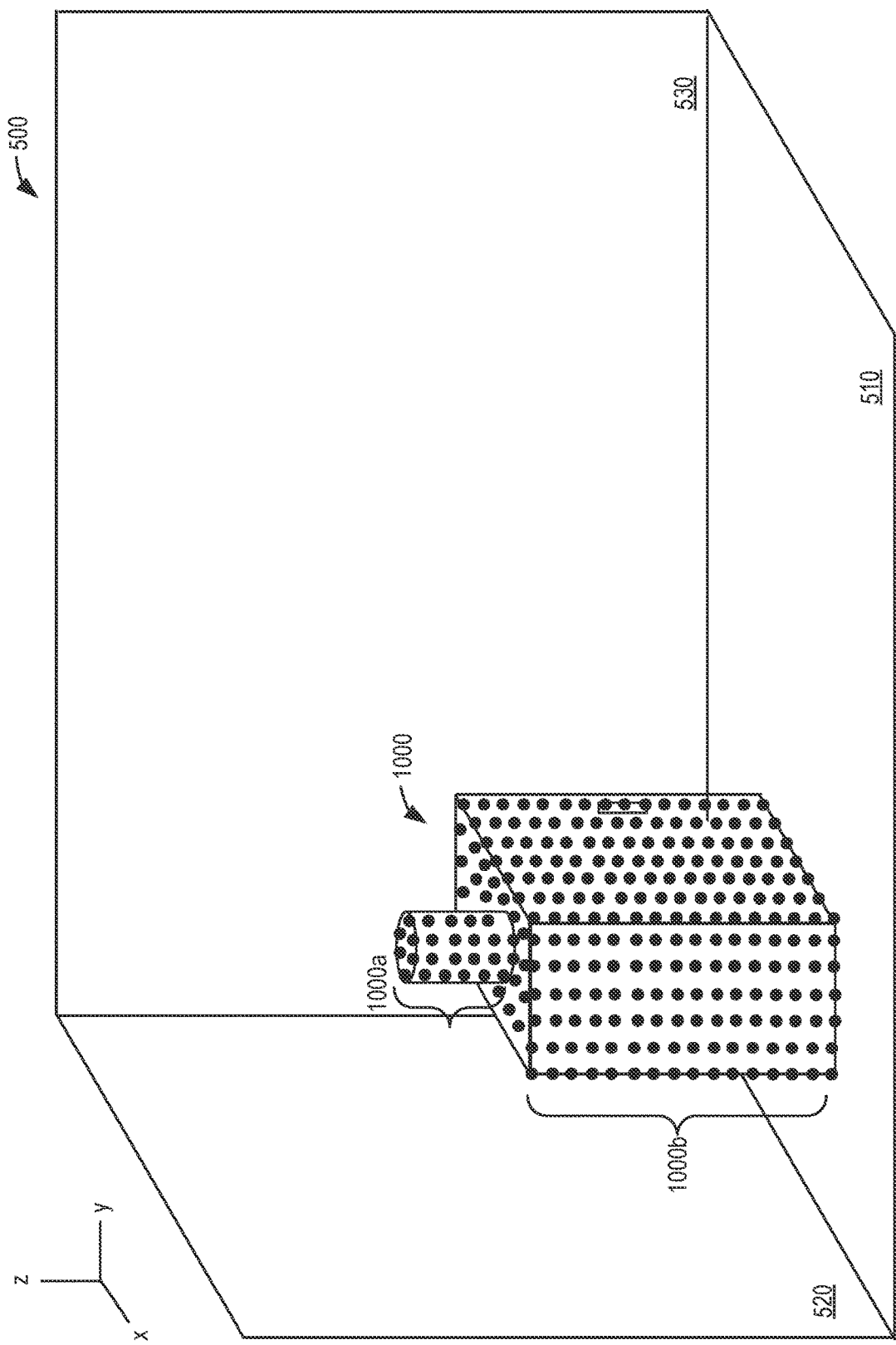
FIG. 10 depicts an example sparse 3D point cloud 1000 consistent with the view of FIG. 5 and the method of FIG. 3A, operation 306, according to various embodiments.

FIG. 10 depicts an example sparse 3D point cloud 1000 consistent with the view of FIG. 5 and the method of FIG. 3A, operation 306, according to various embodiments. This is meant to depict a point cloud associated with a new frame of data based on a different viewpoint than that of FIG. 7A. Here, the left side of the cabinet is in the field of view along with the front surface. Additionally, a left side portion of the vase is in the field of view. A portion 1000a of the point cloud represents the vase and a portion 1000b of the point cloud represents the cabinet.

Figure 11:
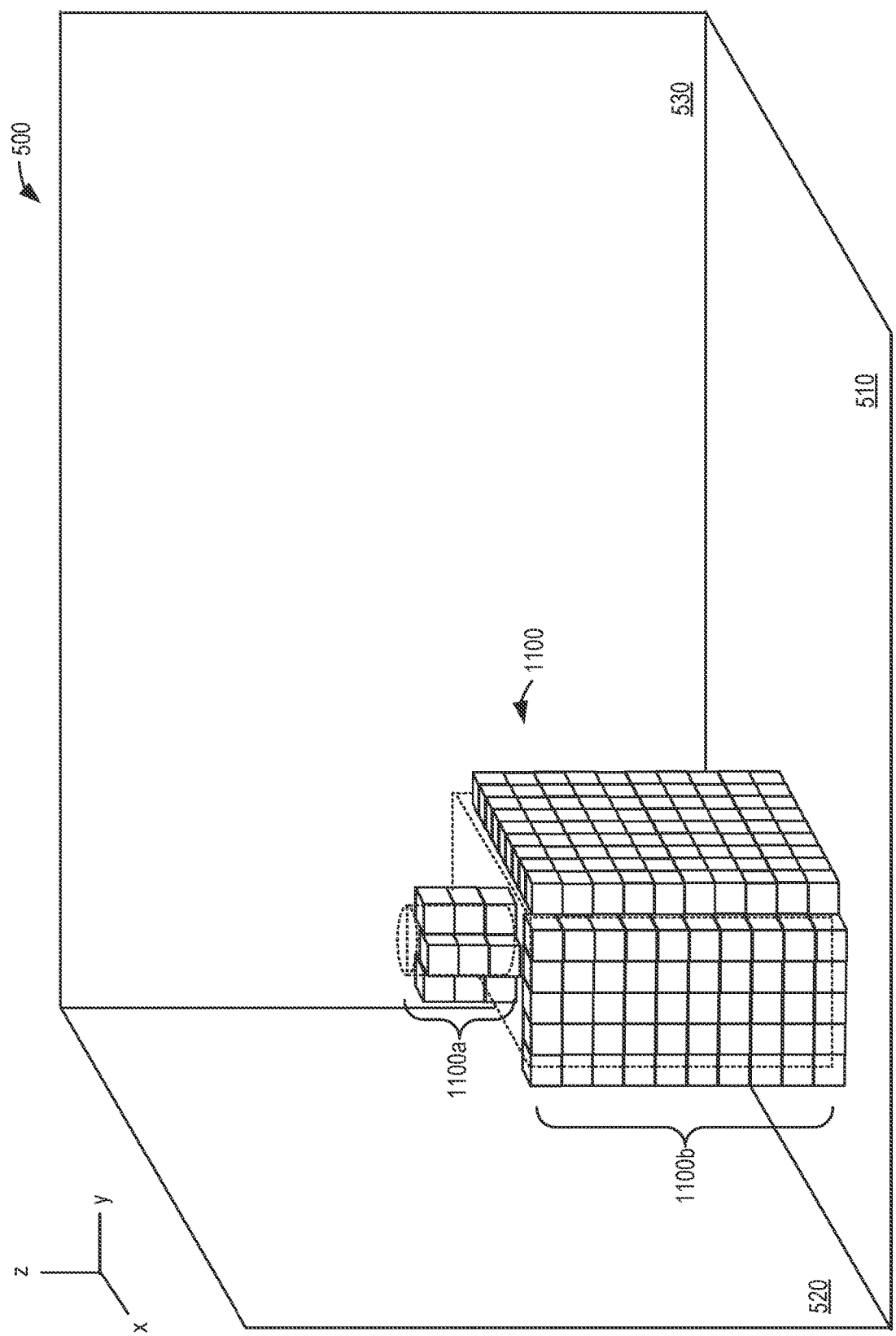
FIG. 11 depicts an example set of voxels 1100 which encompass the points of the sparse 3D point cloud of FIG. 10, consistent with operation 308 of FIG. 3A, according to various embodiments.

FIG. 11 depicts an example set of voxels 1100 which encompass the points of the sparse 3D point cloud of FIG. 10, consistent with operation 308 of FIG. 3A, according to various embodiments. A subset 1100a of the set of voxels encompasses the portion 1000a of the point cloud of FIG. 10, and another subset 1100b of the set of voxels encompasses the portion 1000b of the point cloud of FIG. 10.

FIG. 12A depicts an example point 1200 with a depth d1 in an initial voxel 1201, consistent with operation 304 of FIG. 3A, according to various embodiments. Generally, one or more points of a point cloud can be encompassed within a voxel. In this example, a single point is encompassed. The point has an associated depth d1 and viewing angle va1 represented as a data pair (d1, va1). This data is also therefore associated with the voxel.

FIG. 12B depicts an additional point 1210 with a depth d2 which is within the voxel 1201 of FIG. 12A, and a point 1220 which represents an average between the two points, consistent with operation 304 of FIG. 3A, according to various embodiments. The point 1210 has an associated depth d2 and viewing angle va2 represented as a data pair (d2, va2). When two points of a point cloud are encompassed within a voxel, the associated data can be based on an average, in one possible approach. For example, the average depth is (d1+d2)/2. Similarly, an average viewing angle can be determined as VA=(va1+va2)/2.

Generally, the averaging can be performed when multiple points from a point cloud of a single frame are combined. In other cases, where one point is from one frame and another point is from another frame, e.g., a new frame, a comparison process is performed instead, consistent with operation 310 of FIG. 3A, as discussed. For example, an accuracy metric for the point 1200 (based on d1 and va1) can be compared to an accuracy metric for the point 1210 (based on d2 and va2). The point with the higher accuracy can be selected to represent the voxel.

FIG. 12C depicts an additional point 1230 with a depth d3 in a new voxel 1231, consistent with operation 308 of FIG. 3A, according to various embodiments. The point 1230 has an associated depth d3 and viewing angle va3 represented as a data pair (d3, va3). This data is also therefore associated with the voxel.

Figure 13:
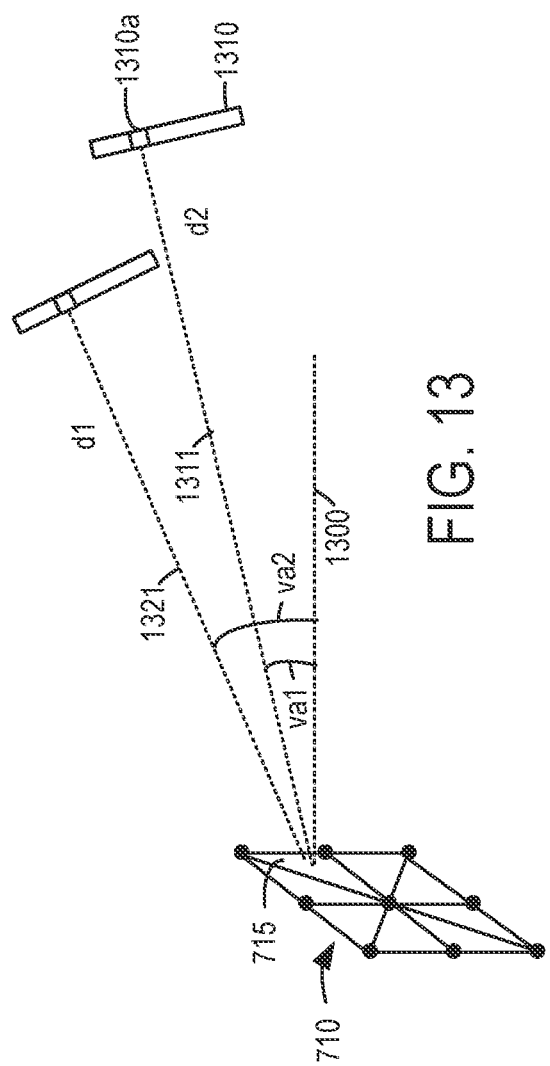
FIG. 13 depicts examples of camera viewpoint angles va1 and vat, consistent with the mesh map portion 710 of FIG. 7B, and with operation 304 of FIG. 3A, according to various embodiments.

FIG. 13 depicts examples of camera viewpoint angles va1 and va2, consistent with the mesh map portion 710 of FIG.

7B, and with operation 304 of FIG. 3A, according to various embodiments. As note, the mesh model includes triangular faces such as the example face 715 to represent the surface of an object. The dashed line 1300 represents a vector or direction which is normal to the face 715. The dashed line 1311 represents a forward looking vector of the camera 1310 having a lens 1310a. This is the direction in which the camera is looking. The dashed line 1311 is at an angle va1 to the dashed line 1300, thus denoting the viewing angle of the camera 1310 in the camera's depicted position. Similarly, the dashed line 1321 represents a forward looking vector of the camera 1310 in a different position. The dashed line 1321 is at an angle vat to the dashed line 1300, thus denoting the viewing angle of the camera 1310 in the camera's depicted position.

In another approach, the viewing angle of the camera is defined as a cosine of the angle between the two vectors. For example, when the angle is va1, the viewing angle is cosine (va1). For small values of va1, the cosine is close to 1. For large values of va1, close to 90 degrees, the cosine is close to 0.

Figure 14:
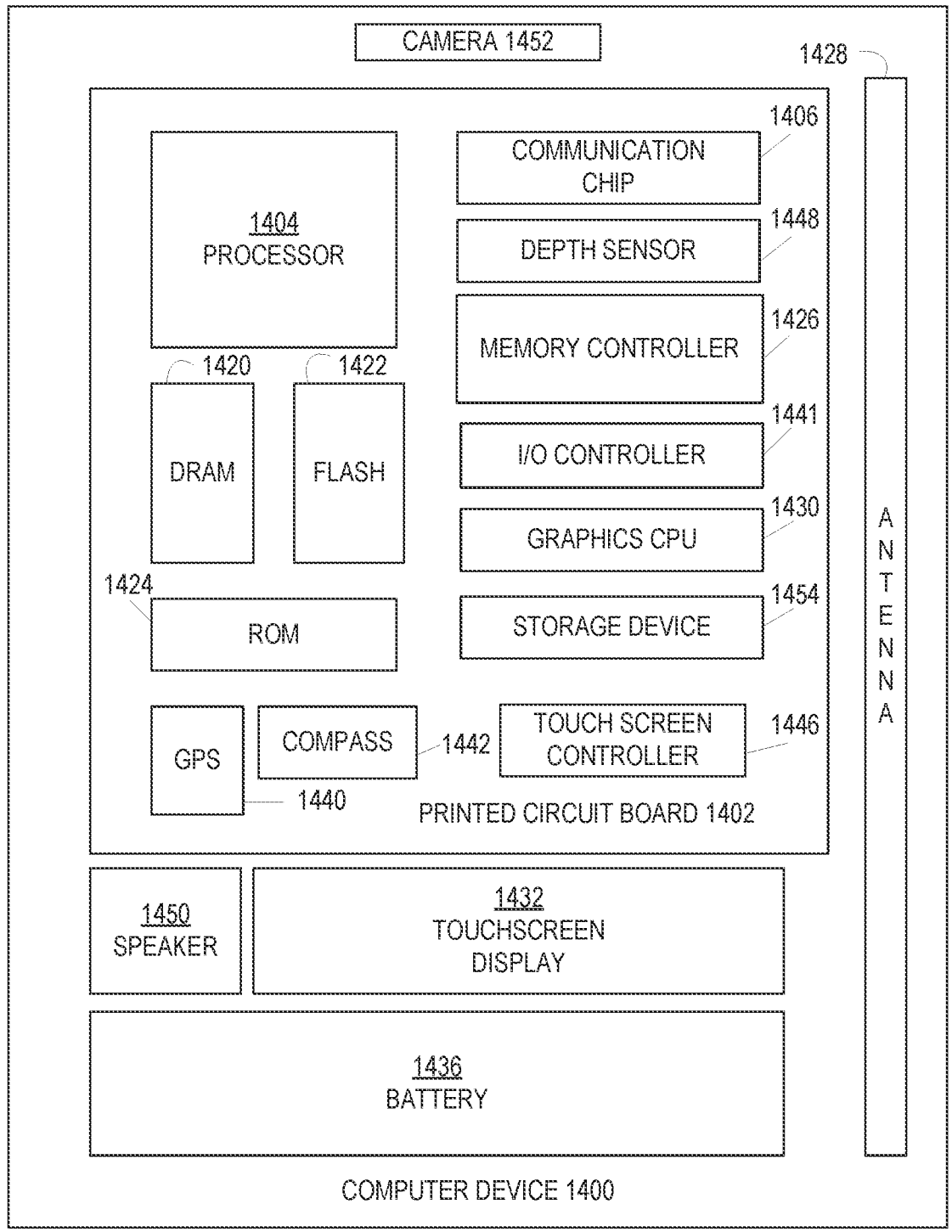
FIG. 14 is a block diagram of an example computer that can be used to implement some or all of the components of the disclosed systems and methods, according to various embodiments.

FIG. 14 illustrates an example computer device 1400 that may be employed by the apparatuses and/or methods described herein, in accordance with various embodiments. As shown, computer device 1400 may include a number of components, such as one or more processor(s) 1404 (one shown) and at least one communication chip 1406. In various embodiments, one or more processor(s) 1404 each may include one or more processor cores. In various embodiments, the one or more processor(s) 1404 may include hardware accelerators to complement the one or more processor cores. In various embodiments, the at least one communication chip 1406 may be physically and electrically coupled to the one or more processor(s) 1404. In further implementations, the communication chip 1406 may be part of the one or more processor(s) 1404. In various embodiments, computer device 1400 may include printed circuit board (PCB) 1402. For these embodiments, the one or more processor(s) 1404 and communication chip 1406 may be disposed thereon. In alternate embodiments, the various components may be coupled without the employment of PCB 1402.

Depending on its applications, computer device 1400 may include other components that may be physically and electrically coupled to the PCB 1402. These other components may include, but are not limited to, memory controller 1426, volatile memory (e.g., dynamic random access memory (DRAM) 1420), non-volatile memory such as read only memory (ROM) 1424, flash memory 1422, storage device 1454 (e.g., a hard-disk drive (HDD)), an I/O controller 1441, a digital signal processor (not shown), a crypto processor (not shown), a graphics processor 1430, one or more antennae 1428, a display, a touch screen display 1432, a touch screen controller 1446, a battery 1436, an audio codec (not shown), a video codec (not shown), a global positioning system (GPS) device 1440, a compass 1442, an accelerometer (not shown), a gyroscope (not shown), a depth sensor 1448, a speaker 1450, a camera 1452, and a mass storage device (such as hard disk drive, a solid state drive, compact disk (CD), digital versatile disk (DVD)) (not shown), and so forth.

In some embodiments, the one or more processor(s) 1404, flash memory 1422, and/or storage device 1454 may include associated firmware (not shown) storing programming instructions configured to enable computer device 1400, in response to execution of the programming instructions by one or more processor(s) 1404, to practice all or selected aspects of process flow 200 or methods 300, 320, 330, 340 and 350 as described herein. In various embodiments, these aspects may additionally or alternatively be implemented using hardware separate from the one or more processor(s) 1404, flash memory 1422, or storage device 1454.

The communication chips 1406 may enable wired and/or wireless communications for the transfer of data to and from the computer device 1400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1406 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1400 may include a plurality of communication chips 1406. For instance, a first communication chip 1406 may be dedicated to shorter range wireless communications such as Wi-Fi and Bluetooth, and a second communication chip 1406 may be dedicated to longer range wireless communications such as GPS, EDGE, GPRS, CDMA, WiMAX, LTE, Ev-DO, and others.

In various implementations, the computer device 1400 may be a laptop, a netbook, a notebook, an ultrabook, a smartphone, a computer tablet, a personal digital assistant (PDA), a desktop computer, smart glasses, or a server. In further implementations, the computer device 1400 may be any other electronic device or circuit that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 15:
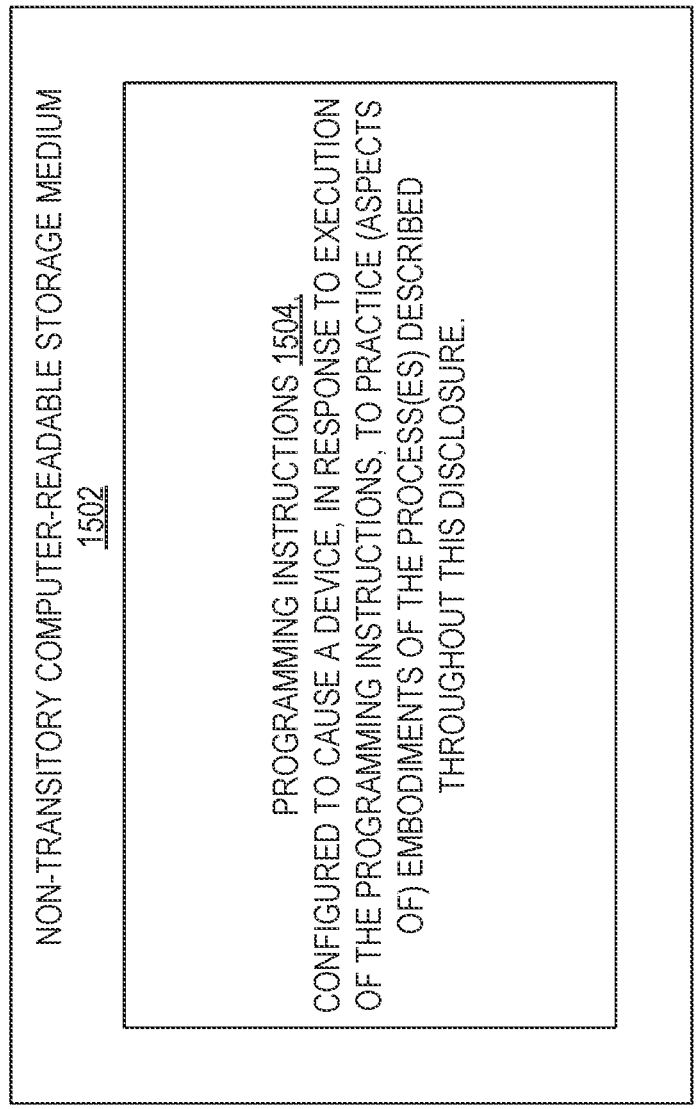
FIG. 15 is a block diagram of a computer-readable storage medium that can be used to implement some of the components of the system or methods disclosed herein, according to various embodiments.

FIG. 15 illustrates an example computer-readable non-transitory storage medium that may be suitable for use to store instructions that cause an apparatus, e.g., a processor or other circuit, in response to execution of the instructions by the apparatus, to practice selected aspects of the present disclosure. As shown, non-transitory computer-readable storage medium 1502 may include a number of programming instructions 1504. Programming instructions 1504 may be configured to enable a device, e.g., computer 1400, in response to execution of the programming instructions, to implement (aspects of) process flow 200 and methods 300, 320, 330, 340 and 350, as described above. In alternate embodiments, programming instructions 1504 may be disposed on multiple computer-readable non-transitory storage media 1502 instead. In still other embodiments, programming instructions 1504 may be disposed on computer-readable transitory storage media 1502, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
   receiving, from a capturing device, one or more frames of depth data;
   generating, from the one or more frames of depth data, a 3D point cloud representation of a 3D space;
   creating an existing set of voxels which encompass the 3D point cloud;
   receiving, from the capturing device, a new frame of depth data;
   generating, from the new frame of depth data, a new 3D point cloud representation of the 3D space;
   determining a number of new voxels needed to encompass points of the new 3D point cloud;
   identifying voxels of the existing set of voxels having depth values to be replaced by corresponding depth values of the new frame of depth data; and
   deciding whether to mark the new frame as a key frame based on the number of new voxels needed to encompass the points of the new 3D point cloud and a number of the voxels for which the depth values are replaced.

2. The method of claim 1, further comprising determining a difference between an accuracy metric associated with the new frame of depth data and an accuracy metric associated with the existing set of voxels, wherein the deciding whether to mark the new frame as the key frame is based on the difference.

3. The method of claim 2, wherein the accuracy metrics are based on depth such that the accuracy metrics are higher when depth is lower.

4. The method of claim 2, wherein the accuracy metrics are based on a viewing angle of the capturing device such that the accuracy metrics are higher when the viewing angle of the capturing device is lower.

5. The method of claim 1, wherein the 3D point cloud representation generated from the one or more frames is a sparse 3D point cloud and the new 3D point cloud representation is a sparse 3D point cloud.

6. The method of claim 1, further comprising:
receiving, from the capturing device, one or more frames of color data associated with the one or more frames of depth data; and
receiving, from the capturing device, a new frame of color data associated with the new frame of depth data.

7. The method of claim 1, further comprising assigning a score based on the number of new voxels and the number of the voxels for which the depth values are replaced, wherein the deciding whether to mark the new frame as the key frame is based on the score.

8. The method of claim 1, further comprising, for the voxels of the existing set of voxels for which the depth values are replaced, replacing viewing angles of the voxels with viewing angles associated with the corresponding depth values of the new frame of depth data.

9. The method of claim 1, wherein each voxel of the existing set of voxels comprises a depth value, the method further comprising:
determining accuracies of depth values of the voxels of the existing set of voxels and of corresponding depth values of the new frame of depth data;
identifying voxels of the existing set of voxels for which the depth values have a lower accuracy than the corresponding depth values of the new frame of depth data; and
replacing the depth values having the lower accuracy with the corresponding depth values of the new frame of depth data.

10. The method of claim 9, wherein the accuracies of the depth values of the voxels of the existing set of voxels and of the corresponding depth values of the new frame increase as depth decreases.

11. The method of claim 9, wherein the accuracy of the depth values of the voxels of the existing set of voxels and of the corresponding depth values of the new frame of data increase as a viewing angle decreases.

12. A non-transitory computer readable medium (CRM) comprising instructions that, when executed by an apparatus, cause the apparatus to:
receive, from a capturing device, one or more frames of depth data;
generate, from the one or more frames of depth data, a 3D point cloud representation of a 3D space;
create an existing set of voxels which encompass the 3D point cloud;
store an existing depth for each voxel of the existing set of voxels;
receive, from the capturing device, a new frame of depth data;
generate, from the new frame of depth data, a new 3D point cloud representation of the 3D space, wherein the new 3D point cloud representation comprises points encompassed by one or more voxels of the existing set of voxels;
for the one or more voxels which encompass the points of the new 3D point cloud, replace the existing depth with a corresponding depth of the new frame when the corresponding depth of the new frame has a greater accuracy than the existing depth; and
decide whether to mark the new frame as a key frame based on a number of the voxels for which the existing depth is replaced.

13. The CRM of claim 12, wherein the instructions, when executed by the apparatus, further cause the apparatus to:
for each voxel of the existing set of voxels for which the existing depth is replaced, replace a viewing angle of the voxel with a viewing angle associated with the corresponding depth of the new frame.

14. The CRM of claim 12, wherein the new 3D point cloud representation of the 3D space comprises points not encompassed by the existing set of voxels, and the instructions, when executed by the apparatus, further cause the apparatus to:
create one or more new voxels for the points not encompassed by the existing set of voxels, wherein the deciding whether to mark the new frame as the key frame is based on a number of the new voxels.

15. The CRM of claim 12, wherein the voxels of the existing set of voxels for which the existing depth is replaced comprise voxels for which the depth is greater than the corresponding depth of the new frame of depth data.

16. The CRM of claim 12, wherein the voxels of the existing set of voxels for which the existing depth is replaced comprise voxels for which a viewing angle is greater than a corresponding viewing angle of the new frame of depth data.

17. A system, comprising:
a processor; and
a storage device in communication with the processor, wherein the storage device includes instructions that, when executed by the processor, cause the processor to:
receive, from a capturing device, one or more frames of depth data;
generate, from the one or more frames of depth data, a 3D point cloud representation of a 3D space;
create an existing set of voxels which encompass the 3D point cloud;
store an existing depth for each voxel of the existing set of voxels;
receive, from the capturing device, a new frame of depth data;
generate, from the new frame of depth data, a new 3D point cloud representation of the 3D space, wherein the new 3D point cloud representation comprises points encompassed by one or more voxels of the existing set of voxels and points not encompassed by the existing set of voxels;
create one or more new voxels for the points not encompassed by the existing set of voxels;
determine a first score based on a number of the new voxels;
determine a second score based on a number of voxels of the existing set of voxels for which the existing depth is to be replaced by a corresponding depth of the new frame of depth data; and
decide whether to mark the new frame as a key frame based on the first score and the second score.

18. The system of claim 17, wherein the voxels of the existing set of voxels for which the existing depth is to be replaced by a corresponding depth of the new frame of depth data comprise voxels for which an accuracy is lower than an accuracy of the corresponding depth of the new frame of depth data.

19. The system of claim 17, wherein the instructions, when executed by the processor, further cause the processor to:
generate a 3D mesh representation of the 3D space based on the 3D point cloud generated from the one or more frames of depth data; and update the 3D mesh representation based on the new frame in response to the new frame being marked as a key frame.

\* \* \* \* \*